United States Patent
Shin et al.

(10) Patent No.: US 12,475,600 B2
(45) Date of Patent: Nov. 18, 2025

(54) ELECTRONIC DEVICE AND METHOD FOR PROVIDING COLOR RECOMMENDATION INFORMATION WITH RESPECT TO SPACE

(71) Applicant: SAMSUNG ELECTRONICS CO., LTD., Suwon-si (KR)

(72) Inventors: Jaewook Shin, Suwon-si (KR); Haedong Yeo, Suwon-si (KR); Hyungdong Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 313 days.

(21) Appl. No.: 18/082,926

(22) Filed: Dec. 16, 2022

(65) Prior Publication Data
US 2023/0206504 A1    Jun. 29, 2023

Related U.S. Application Data

(63) Continuation of application No. PCT/KR2022/019683, filed on Dec. 6, 2022.

(30) Foreign Application Priority Data

Dec. 28, 2021 (KR) .................. 10-2021-0190340
Jun. 3, 2022 (KR) .................. 10-2022-0068500

(51) Int. Cl.
*G06T 7/90* (2017.01)
*G06T 7/70* (2017.01)
(Continued)

(52) U.S. Cl.
CPC .................. *G06T 7/90* (2017.01); *G06T 7/70* (2017.01); *G06V 10/56* (2022.01); *G09G 5/14* (2013.01);
(Continued)

(58) Field of Classification Search
CPC ......... G06Q 30/0631; G06T 7/70; G06T 7/90; G06T 2207/10024; G06T 2207/20081; G06V 10/56
See application file for complete search history.

(56) References Cited

U.S. PATENT DOCUMENTS 9,524,563 B2    12/2016  Sayre, III et al.
10,109,051 B1 *  10/2018  Natesh .................. G06V 20/10
(Continued)

FOREIGN PATENT DOCUMENTS

CN    106202352 A    12/2016
CN    108694266 A    10/2018
(Continued)

OTHER PUBLICATIONS

Search Report & Written Opinion (PCT/ISA/220, PCT/ISA/210 & PCT/ISA/237) issued Mar. 14, 2023 by the International Searching Authority for International Patent Application No. PCT/KR2022/019683.
(Continued)

*Primary Examiner* — Sean T Motsinger
(74) *Attorney, Agent, or Firm* — Sughrue Mion, PLLC

(57) ABSTRACT

An electronic device comprises a processor configured to: obtain a spatial image comprising a plurality of pixels corresponding to a plurality of objects, perform a pixel analysis on the plurality of pixels to extract one or more colors from the spatial image, obtain, based on the extracted one or more colors, color characteristic information about colors included in the plurality of objects in the spatial image and relation characteristic information defining relations between the plurality of objects in the spatial image, obtain, by applying the color characteristic information and the relation characteristic information to a first artificial intelligence model, a score of a color combination between each of the colors included in the plurality of objects in the spatial
(Continued)

image and an arbitrary color, and provide color recommendation information with respect to a space comprising the plurality of objects, based on the score of the color combination.

20 Claims, 26 Drawing Sheets

(51) Int. Cl.
G06V 10/56 (2022.01)
G09G 5/14 (2006.01)
(52) U.S. Cl.
CPC ............ *G06T 2207/10024* (2013.01); *G06T 2207/20081* (2013.01); *G06T 2207/30201* (2013.01)

(56) References Cited

U.S. PATENT DOCUMENTS

| | | | | |
|---|---|---|---|---|
| 10,853,839 | B1* | 12/2020 | Galep | G06Q 30/0244 |
| 2013/0085893 | A1* | 4/2013 | Bhardwaj | G06F 16/583 |
| | | | | 705/26.62 |
| 2015/0363943 | A1* | 12/2015 | Yalniz | G06T 11/001 |
| | | | | 345/591 |
| 2018/0156663 | A1* | 6/2018 | Farley | G01J 3/462 |
| 2018/0158128 | A1* | 6/2018 | Dorner | G06Q 30/0643 |
| 2018/0210118 | A1 | 7/2018 | Gollier et al. | |
| 2018/0260843 | A1* | 9/2018 | Hiranandani | G06Q 30/0255 |
| 2018/0330421 | A1* | 11/2018 | Reynolds | G06Q 30/0629 |
| 2019/0378204 | A1* | 12/2019 | Ayush | G06Q 30/0643 |
| 2020/0258276 | A1 | 8/2020 | Ayush et al. | |
| 2022/0277542 | A1 | 9/2022 | Li et al. | |
| 2023/0153889 | A1* | 5/2023 | Baek | G06F 16/55 |
| | | | | 705/26.7 |
| 2023/0206504 | A1* | 6/2023 | Shin | G06T 11/001 |
| | | | | 382/162 |
| 2024/0354994 | A1* | 10/2024 | Echevarria Vallespi | |
| | | | | G06Q 30/0643 |

FOREIGN PATENT DOCUMENTS

| | | |
|---|---|---|
| CN | 111079001 A | 4/2020 |
| KR | 10-2011-0035278 A | 4/2011 |
| KR | 10-2013-0021142 A | 3/2013 |
| KR | 10-2014-0125996 A | 10/2014 |
| KR | 10-2018-0016431 A | 2/2018 |
| KR | 10-2018-0040865 A | 4/2018 |
| KR | 10-2234609 B1 | 4/2021 |
| KR | 10-2234614 B1 | 4/2021 |

OTHER PUBLICATIONS

Extended European Search Report dated Apr. 15, 2024, issued by the European Patent Office in European Application No. 22916499.1.

Ataer-Cansizoglu et al., "Room Style Estimation for Style-Aware Recommendation", 2019 IEEE International Conference on Artificial Intelligence and Virtual Reality (AIVR), 2019, pp. 267-270 (4 pages total).

Communication issued Aug. 11, 2025 by the Intellectual Property Office of India in Indian Patent Application No. 202447028833.

\* cited by examiner

ELECTRONIC DEVICE AND METHOD FOR PROVIDING COLOR RECOMMENDATION INFORMATION WITH RESPECT TO SPACE

CROSS-REFERENCE TO RELATED APPLICATIONS

This application is a by-pass continuation application of International Application No. PCT/KR2022/019683, filed on Dec. 6, 2022, which claims priority to Korean Patent Application No. 10-2022-0068500, filed on Jun. 3, 2022 in the Korean Intellectual Property Office, and Korean Patent Application No. 10-2021-0190340, filed on Dec. 28, 2021, in the Korean Intellectual Property Office, the disclosures of which are incorporated by reference herein in their entireties.

TECHNICAL FIELD

The disclosure relates to an electronic device and method for providing color recommendation information with respect to a space.

BACKGROUND ART

In the interior design field, objects constituting a space, such as wallpaper, landscape, things, furniture, home appliances, etc., have their respective colors, and the color harmony of the objects is an important factor in determining a good interior. However, despite the fact that users, when purchasing a product to constitute a specific space, may precisely choose the exterior color of the product, in many cases the users often choose a color they are not satisfied with after careful consideration.

Accordingly, when a user desires to purchase the product for the specific space, there is technological need to analyze the space and determine whether the product is suitable for the specific space of the user according to what color the product has and recommending the product.

Furthermore, when recommending the color of the product to the user, recommending a new product having the same color as the color already used in the user's space may give a monotonous feeling, and thus, there is a technological need of analyzing a color scheme of the specific space for recommending a product having a suitable color scheme tor the space.

SUMMARY

Various embodiments of the disclosure may provide an electronic device and method for recommending a color scheme of a product, based on a spatial image.

According to some embodiments, an electronic device comprising: a memory storing one or more instructions; and a processor configured to execute the one or more instructions stored in the memory to: obtain a spatial image comprising a plurality of pixels corresponding to a plurality of objects, perform a pixel analysis on the plurality of pixels to extract one or more colors from the spatial image, obtain, based on the extracted one or more colors, color characteristic information about colors included in the plurality of objects in the spatial image and relation characteristic information defining relations between the plurality of objects in the spatial image, obtain, by applying the color characteristic information and the relation characteristic information to a first artificial intelligence model, a score of a color combination between each of the colors included in the plurality of objects in the spatial image and an arbitrary color, and provide color recommendation information with respect to a space comprising the plurality of objects, based on the score of the color combination.

According to an embodiment of the disclosure, the processor may be further configured to execute the one or more instructions stored in the memory to obtain object characteristic information including information about a type or position of each object in the plurality of objects, and obtain the score of the color combination by further applying the object characteristic information to the first artificial intelligence model.

According to some embodiments, the relation characteristic information comprises at least one of (i) information about position adjacency between at least a first object from the plurality of objects and a second object from the plurality of objects, or (ii) information about category relevance between the first object and the second object of objects.

According to some embodiments of the disclosure, the relation characteristic information may include at least one of information about position adjacency between the plurality of objects or information about category relevance between the plurality of objects.

According to some embodiments of the disclosure, the processor may be further configured to execute the one or more instructions stored in the memory to obtain information about a first interior style corresponding to the spatial image from a plurality of interior styles, and select the first artificial intelligence model corresponding to the first interior style from a plurality of artificial intelligence models.

According to some embodiments of the disclosure, the first artificial intelligence model may be configured to obtain a plurality of training images, obtain a co-occurrence count or color with respect to the plurality of training objects in the plurality of training images, based on the plurality of training images, obtain training scores of color combinations between colors included in the plurality of training objects in the plurality of training images, based on the co-occurrence count or color, and obtain scores of color combinations of the plurality of objects in the spatial image, based on the training scores of the color combinations.

According to some embodiments of the disclosure, the first artificial intelligence model may be trained to estimate a first color scheme score of a color combination between a color included in at least a first object the plurality of objects and an arbitrary color, based on the training scores of the color combinations, and the processor may be further configured to execute the one or more instructions stored in the memory to provide color recommendation information with respect to a first object selected by a user from the plurality of objects in the spatial image, based on the first color scheme score.

According to some embodiments of the disclosure, based on a determination the first object includes a plurality of faces including a first face and a second face, the first artificial intelligence model may be trained to estimate a second color scheme score of a color combination between a color included in the first face and the arbitrary color, based on the training scores of the color combinations, and the processor may be further configured to execute the one or more instructions stored in the memory to provide color recommendation information with respect to the second face selected by the user based on the second color scheme score.

According to some embodiments of the disclosure, the electronic device may further include a communication interface, and the processor may be further configured to execute the one or more instructions stored in the memory to, based on a determination the first object is an external device including a display, transmit the color recommendation information to the first object through the communication interface so that a color based on the color recommendation information with respect to the first object is displayed on the display of the first object.

According to some embodiments of the disclosure, the processor may be further configured to execute the one or more instructions stored in the memory to, based on a determination the display includes a first panel and a second panel, obtain first color recommendation information with respect to the first panel and second color recommendation information with respect to the second panel, based on the score of the color combination, and transmit the first color recommendation information with respect to the first panel and the second color recommendation information with respect to the second panel to the first object through the communication interface so that a first color based on the first color recommendation information is displayed on the first panel, and a second color based on the second color recommendation information is displayed on the second panel.

According to some embodiments of the disclosure, the processor may be further configured to execute the one or more instructions stored in the memory to, when the second panel is a part of the first panel, provide the first color recommendation information with respect to the first panel, based on the first color scheme score, and provide the second color recommendation information with respect to the second panel, based on the first color scheme score and the second color scheme score.

According to some embodiments of the disclosure, when the first object is a refrigerator, the second panel may correspond to a position of a food ingredient of which a storage period exceeds a threshold period.

According to some embodiments of the disclosure, the processor may be further configured to execute the one or more instructions stored in the memory to select an item corresponding to schedule information of the user, and transmit information about the item and color recommendation information with respect to the first object to the third object through the communication interface so that the item is displayed on the display in a color based on the color recommendation information with respect to the first object.

According to some embodiments, a method, performed by an electronic device, of recommending a color of an object, comprises: obtaining a spatial image comprising a plurality of pixels corresponding to a plurality of objects; performing a pixel analysis on the plurality of pixels to extract one or more colors from the spatial image; obtaining, based on the extracted one or more colors, color characteristic information about colors included in the plurality of objects in the spatial image and relation characteristic information defining relations between the plurality of objects in the spatial image; obtaining, by applying the color characteristic information and the relation characteristic information to a first artificial intelligence model, a score of a color combination between each of the colors included in the plurality of objects in the spatial image and an arbitrary color; and providing color recommendation information with respect to a space comprising the plurality of objects, based on the score of the color combination.

According to some embodiments of the disclosure, the relation characteristic information includes at least one of (i) information about position adjacency between at least a first object from the plurality of objects and a second object from the plurality of objects, or (iii) information about category relevance between the first object and the second object.

According to some embodiments of the disclosure, the method may further include obtaining information about a first interior style corresponding to the spatial image from a plurality of interior styles, and selecting the first artificial intelligence model corresponding to the first interior style from a plurality of artificial intelligence models.

According to some embodiments of the disclosure, the first artificial intelligence model may be configured to obtain a plurality of training images, obtain a co-occurrence count or color with respect to the plurality of training objects in the plurality of training images, based on the plurality of training images, obtain training scores of color combinations between colors included in the plurality of training objects in the plurality of training images, based on the co-occurrence count or color, and obtain scores of color combinations of the plurality of objects in the spatial image, based on the training scores of the color combinations.

According to some embodiments of the disclosure, the first artificial intelligence model may be trained to estimate a first color scheme score of a color combination between a color included in at least a first object from the plurality of objects and an arbitrary color, based on the training scores of the color combinations, and the providing of the color recommendation information may include providing color recommendation information with respect to an object selected by a user from the plurality of objects in the spatial image, based on the first color scheme score.

According to some embodiments of the disclosure, based on a determination the first object includes a plurality of faces including a first face and a second face, the first artificial intelligence model may be trained to estimate a second color scheme score of a color combination between a color included in the first face and the arbitrary color, based on the training scores of the color combinations, and color recommendation information with respect to the second face selected by the user may be provided based on the second color scheme score.

According to some embodiments of the disclosure, the method may further include, based on a determination the first object is an external device including a display, transmitting the color recommendation information to the first object through the communication interface so that a color based on the color recommendation information with respect to the first object is displayed on the display of the first object.

According to some embodiments, a non-transitory computer readable medium, having instructions stored therein, which when executed by a processor in an electronic device cause the processor to execute a method comprising: obtaining a spatial image comprising a plurality of pixels corresponding to a plurality of objects; performing a pixel analysis on the plurality of pixels to extract one or more colors from the spatial image, obtaining, based on the extracted one or more colors, color characteristic information about colors included in the plurality of objects in the spatial image and relation characteristic information defining relations between the plurality of objects in the spatial image; obtaining, by applying the color characteristic information and the relation characteristic information to a first artificial intelligence model, a score of a color combination between each of the colors included in the plurality of objects in the spatial image and an arbitrary color; and providing color recommendation information with respect to a space comprising the plurality of objects, based on the score of the color combination.

MODE OF DISCLOSURE

Figure 1:
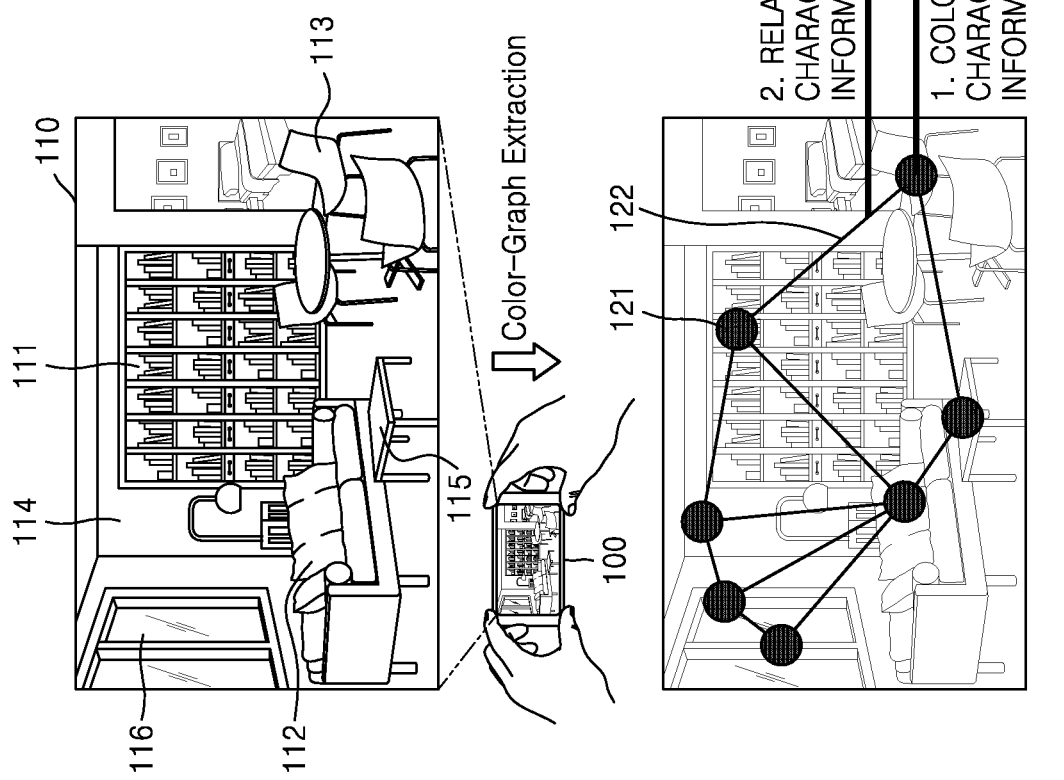
FIG. 1 is a diagram illustrating an electronic device providing color recommendation information, according to various embodiments of the disclosure.

Throughout the disclosure, the expression "at least one of a, b or c" indicates only a, only b, only c, both a and b, both a and c, both b and c, all of a, b, and c, or variations thereof.

Hereinafter, various embodiments of the disclosure will be disclosed with reference to the accompanying drawings. However, the detailed description is not intended to limit the disclosure to any particular embodiment of the disclosure, and it should be understood as including various modifications, equivalents, and/or alternatives according to the embodiment of the disclosure. In connection with the description of the drawings, like reference numerals may be used for like components.

In the disclosure, an expression such as "having," "may have," "comprising," or "may comprise" indicates the existence of a corresponding characteristic (e.g., a numerical value, function, operation, or component such as a part) and does not exclude the existence of additional characteristics.

In the disclosure, an expression such as "A or B," "at least one of A or/and B," or "one or more of A or/and B" may include all possible combinations the listed items. For example, "A or B," "at least one of A and B," or "one or more of A or B" may indicate the entire of (1) including at least one A, (2) including at least one B, or (3) including both at least one A and at least one B.

Expressions such as "first," "second," "primarily," or "secondary," used in the disclosure may represent various components regardless of order and/or importance and do not limit corresponding components. The expressions may be used for distinguishing one component from another component. For example, a first user device and a second user device may represent different user devices regardless of order or importance. For example, a first component may be referred to as a second component without deviating from the scope of the disclosure, and similarly, a second component may be referred to as a first component.

As used in the disclosure, terms such as "module", "unit", "part", etc. are terms used to refer to a component that performs at least one function or operation, and such a component may be implemented in hardware or software or may be implemented as a combination of hardware and software. In addition, a plurality of "modules", "units", "parts", etc. are integrated into at least one module or chip, except when each needs to be implemented in individual specific hardware, and may be implemented as at least one processor.

When it is described that a component (such as a first component) is "operatively or communicatively coupled" to or "connected" to another component (such as a second component), it should be understood that the component may be directly connected to the other component or may be connected to the other component through a third component. However, when it is described that a component (such as a first component) is "directly connected" or "directly coupled" to another component (such as a second component), it should be understood that that there is no intermediate component (such as a third component) between the component and the other component.

Terms defined in the disclosure may be used to describe a specific embodiment and may not have an intention to limit the scope of any of the embodiments of the disclosure. A singular form may include a plurality of forms unless it is explicitly differently represented. Terms used herein, including technical and scientific terms, may have the same meaning as a meaning that may be generally understood by a person of ordinary skill in the art. It may be determined that generally using terms defined in a dictionary have the same meaning as or a meaning similar to that of a context of related technology and are not meant as an ideal or excessively formal meaning unless explicitly defined. In some cases, even terms defined in the disclosure may not be construed to exclude embodiments of the disclosure.

FIG. 1 is a diagram illustrating an electronic device 100 providing color recommendation information, according to some embodiments of the disclosure.

Referring to FIG. 1, the electronic device 100 according to some embodiments of the disclosure may obtain a spatial image 110 including a plurality of objects. The spatial image 110 may be, for example, an image of a space inside a user's house, an image of a work space, an image of a commercial space, an image of an exhibition space. The type of the spatial image 110 does not limit the disclosure. For example, the spatial image may be a work of art including a plurality of objects. The spatial image 110 may further be an image of an exterior of a house, building, or any other structure. In FIG. 1, a case in which the spatial image 110 is an image of a space inside a user's house is described as an example.

The electronic device 100 may obtain the spatial image 110 by using at least one camera. The at least one camera may be a standalone digital camera, or may be incorporated in a phone, tablet, laptop, or any other electronic device known to one of ordinary skill in the art. The electronic device 100 may receive the spatial image 110 from an external electronic device. The spatial image 110 may be a still image or a moving image. Furthermore, the spatial image 110 may be a panoramic image.

The plurality of objects included in the spatial image 110 are elements constituting the space, and may include furniture (e.g., bed, dressing table, mirror, etc.), home appliances (e.g., air purifier, air conditioner, TV, etc.), structures (e.g., wall, floor, door, and window), interior accessories (e.g., picture frame, carpet, calendar, flowerpot, clock, lighting, etc.), but are not limited thereto. In FIG. 1, a case in which the plurality of objects included in the spatial image 110 are a cabinet 111, a sofa 112, a chair 113, a sidewall 114, a table 115, and a window 116 is described as an example.

The electronic device 100, according to some embodiments of the disclosure, may obtain color characteristic information 121 and relation characteristic information 122 from the plurality of objects included in the spatial image 110 (Color-Graph Extraction).

The color characteristic information 121 may be information about colors included in the plurality of objects in the spatial image 110. In FIG. 1, the color characteristic information 121 indicates information corresponding to the cabinet 111, but is not limited thereto. For example, the color characteristic information 121 may be information corresponding to the sofa 112 or information corresponding to the chair 113.

The color characteristic information 121 may include information about the color of each of the plurality of objects in the spatial image 110, information about the color distribution of the spatial image 110, information about an area occupied by each color in the spatial image 110, information about a main color in the spatial image 110, information about a color combination, information about a color series, etc. For example, the color characteristic information 121 may include information about brown, which is a color included in the cabinet 111. As another example, the color characteristic information 121 may include information about beige, which is a color included in the sofa 112. As another example, the information about the color combination may be information about a color included in the spatial image 110 combined with another color included in the spatial image 110, and/or another color not included in the spatial image 110.

The relation characteristic information 122 may be information defining relations between the plurality of objects in the spatial image 110. The relation characteristic information 122 may be information defining a relation between any two objects among the plurality of objects. In FIG. 1, the relation characteristic information 122 may indicate information defining a relation between the cabinet 111 and the chair 113, but is not limited thereto. For example, the relation characteristic information 122 may be information defining a relation between the table 115 and the sidewall 114.

The relation characteristic information 122 may include at least one of information about location adjacency between the plurality of objects or information about category relevance between the plurality of objects.

The information about location adjacency between the plurality of objects may be information about whether at least two or more objects among the plurality of objects are adjacent, and may be determined based on a distance between the objects. For example, the information about location adjacency between the plurality of objects may include information that the cabinet 111 and the sidewall 114 are adjacent to each other in terms of location, information indicating that because the window 116 is disposed in the sidewall 114, the window 116 and the sidewall 114 are adjacent to each other in terms of location, information indicating that the sofa 112 is adjacent to the table 115 rather than the chair 113, etc.

The information about the category relevance between the plurality of objects may be information about a degree of relevance between categories of at least two or more objects among the plurality of objects, and may be determined based on categories of the objects. The degree of relevance between the categories may be determined in consideration of the purpose and time of use of the plurality of objects, a space in which the plurality of objects are mainly disposed, etc.

For example, the information about category relevance between the plurality of objects may include information indicating that because it is common for the sofa 112 and the table 115 to be disposed adjacent to each other for the purpose of use, the categorical relevance between the sofa 112 and the table 115 is high, information indicating that because the window 116 is disposed in the sidewall 114, the categorical relevance between the window 116 and the sidewall 114 is high, and/or information indicating that because a picture frame is generally placed on a sidewall rather than the ceiling, the category relation between the picture frame and the sidewall is higher than the category relation between the picture frame and the ceiling.

The electronic device 100, according to embodiments of the disclosure, may apply the color characteristic information 121 and the relation characteristic information 122 to a first artificial intelligence model 130 and recommend a color suitable for the space in which the spatial image 110 is obtained.

The first artificial intelligence model 130 may be a network trained to estimate a score of a color combination with respect to at least two or more colors. The first artificial intelligence model 130 may be trained to estimate the score of the color combination by using the color characteristic information 121 and the relation characteristic information 122 obtained through the plurality of spatial images. Accordingly, the first artificial intelligence model 130 may be trained to recommend a color suitable for a specific spatial image 110, based on colors and relations of a plurality of objects in the specific spatial image 110.

The score of the color combination (hereinafter, also referred to as a color combination score) may be a numerical value of a degree of matching between all colors and any colors in a spatial image. The color combination score may be expressed as an interior score. Details regarding the color combination score will be described in further detail below with reference to FIGS. 10 to 12.

The first artificial intelligence model 130 may be a model corresponding to a specific interior style of the spatial image. The first artificial intelligence model 130 may be a network trained to estimate a score of a color combination in view of a specific interior style with respect to at least two or more colors.

For example, the first artificial intelligence model 130 may be trained to estimate the score of the color combination by using the color characteristic information 121 and the relation characteristic information 122 obtained through a plurality of spatial images of a modern interior style. Accordingly, the first artificial intelligence model 130 may be trained to recommend a color suitable for the specific spatial image 110 in view of the modern interior style, based on colors and relations of the plurality of objects in the specific spatial image 110.

However, the type of interior style is only an example, and the disclosure is not limited thereto.

The electronic device 100 may select a color in consideration of the color characteristic information 121 and the relation characteristic information 122 of the plurality of objects included in the spatial image 110, by using the first artificial intelligence model 130, and provide color recommendation information about the selected color.

For example, a user may desire to arrange a home appliance (e.g., a refrigerator) 140 in a house space. At this time, the electronic device 100 may obtain the spatial image 110 of the house space, extract the color characteristic information 121 and the relation characteristic information 122 from the spatial image 110, select a color of the home appliance 140 suitable for the house space, by applying the color characteristic information 121 and the relation characteristic information 122 to the first artificial intelligence model 130, and recommend the selected color of the home appliance 140 to the user.

Specifically, the electronic device 100 may select a color that matches colors included in the cabinet 111, the sofa 112, the chair 113, etc. included in the spatial image 110 as the color of the home appliance 140 by using the color characteristic information 121. In addition, the electronic device 100 may select the color of the home appliance 140 with respect to a color included in the sidewall 114 that is highly related to the home appliance (e.g., refrigerator) 140 by using the relation characteristic information 122.

Accordingly, according to some embodiments of the disclosure, the electronic device 100 may identify a color combination of an object commonly used and preferred by a great number of people based on a plurality of spatial images, and recommend a color suitable for a user's house space based on the spatial image 110 of a user. Hereinafter, a method, performed by the electronic device 100, of providing color recommendation information is described in more detail with reference to FIG. 2.

Figure 2:
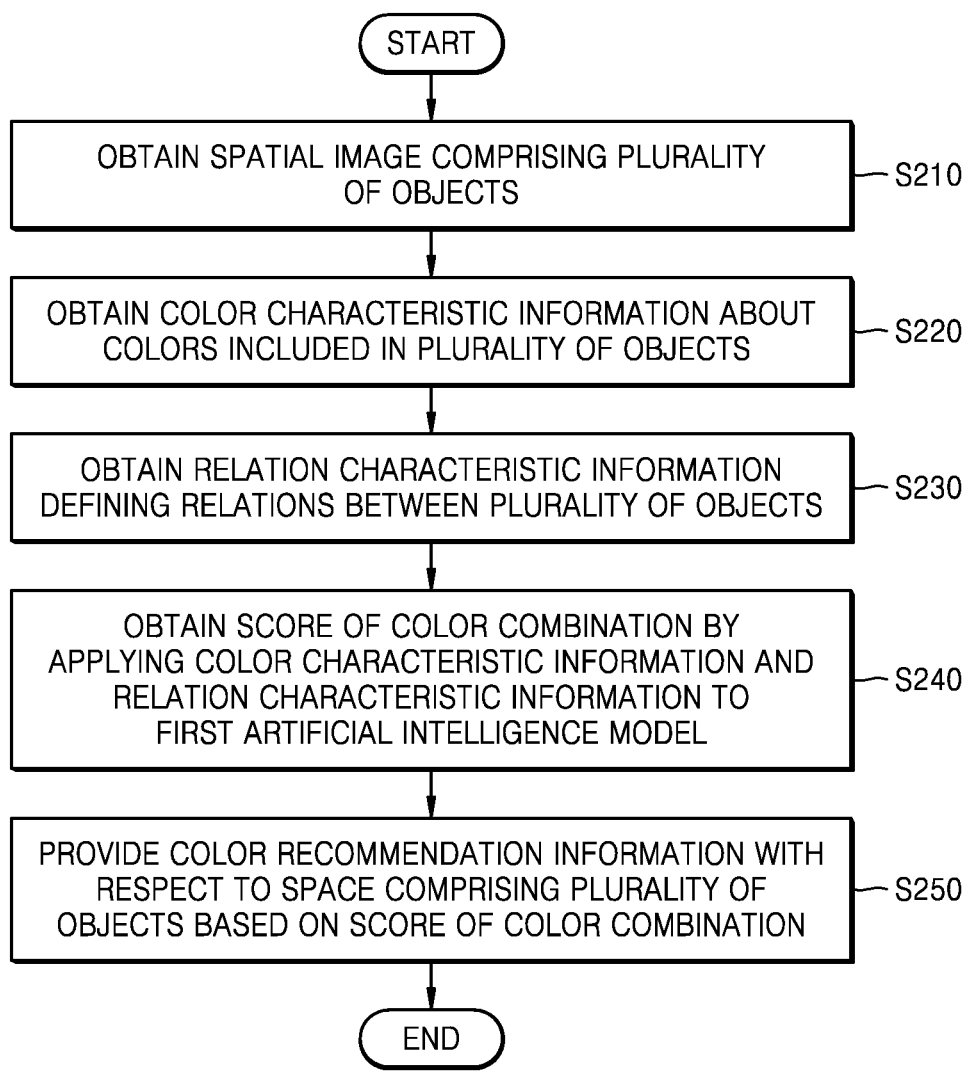
FIG. 2 is a flowchart illustrating a method of providing color recommendation information, according to various embodiments of the disclosure.

FIG. 2 is a flowchart illustrating a method of providing color recommendation information according to some embodiments of the disclosure.

Referring to FIG. 2, in operation S210, the electronic device 100, according to some embodiments of the disclosure, may obtain a spatial image including a plurality of objects. The spatial image may be an image including a plurality of objects disposed in a specific space. The spatial image may correspond to an image inside a user's house. The spatial image may be an image of the entire space inside the house, or may be an image of a specific space inside the house. For example, the spatial image may be a photograph of a living room in the inside of the user's house.

The spatial image may correspond to a photograph of the inside of the house including an interior style, but the disclosure is not limited thereto. For example, the spatial image may be a work of art including a plurality of objects. As another example, the spatial image may be a digital photo or a screen capture of video content.

The plurality of objects may correspond to all objects arranged in the spatial image. The plurality of objects may correspond to all objects having colors in the spatial image. For example, when the spatial image is an image of the inside of the user's house, the plurality of objects included in the spatial image may correspond to furniture such as a a desk, a chair, a stand, etc., and all objects including a ceiling and a floor. As another example, the plurality of object included in the spatial image may correspond to one or more appliances such as a refrigerator, dishwasher, television, etc. As another example, when the spatial image is a work of art depicting a forest, the plurality of objects included in the spatial image may include trees, grass, sky, and flowers.

The electronic device 100 may obtain the spatial image including the plurality of objects by directly photographing a specific space through a camera unit, or recording a video of the specific space and providing at least one frame of the video as the spatial image. However, the method of obtaining the spatial image does not limit the disclosure. For example, the electronic device 100 may receive, through a communication interface, a spatial image including a plurality of objects obtained by an external electronic device photographing a specific space. The external electronic device may be, for example, a cleaning robot, a CCTV, a drone, etc.

In operation S220, the electronic device 100, according to some embodiments of the disclosure, may obtain color characteristic information about colors included in the plurality of objects. For example, when a chair is included in the spatial image, the electronic device 100 may obtain color characteristic information about a color of the chair included in the spatial image. When the color of the chair is pink, the electronic device 100 may obtain color characteristic information about the pink color.

Specifically, the electronic device 100, according to some embodiments of the disclosure, may determine the types of colors of the plurality of objects constituting the spatial image 110, and determine a ratio in which each of the types of colors of the plurality of objects constituting the spatial image 110 is used. The electronic device 100 may perform a pixel analysis of the spatial image 110 to extract N representative colors from among the colors existing in the spatial image 110 and determine the type of the representative color and a ratio in which each of the representative colors is used. For example, the electronic device 100 may cluster pixels having similar colors in the spatial image 110 into N clusters by using a k-means clustering algorithm. The k-means clustering algorithm, for example, is a signal processing algorithm that includes a process of vector quantization for portioning n observations into k clusters in which each observation belongs to the cluster with the nearest mean.

The electronic device 100 may determine the types of colors of the plurality of objects constituting the spatial image 110 and the ratio in which each of the types of colors is used, based on the clustered pixels. However, the method, performed by the electronic device 100, of obtaining the color characteristic information is merely an example. The disclosure is not limited thereto, and the electronic device 100 may use other algorithms, such as Iterative Quantization and Soft Color Segmentation, for analyzing the pixels of the spatial image to obtain the color characteristic information.

In operation S230, the electronic device 100, according to some embodiments of the disclosure, may obtain relation characteristic information defining relations between the plurality of objects. The relation characteristic information may be information defining a relation between at least two or more objects among the plurality of objects. The relation characteristic information may include information about location adjacency between the plurality of objects and information about category relation between the plurality of objects.

Among the relation characteristic information, the information about location adjacency may include information about how adjacent two objects are in terms of location. Furthermore, among the relation characteristic information, the information about category relevance may include information about how categories of two objects are related.

The electronic device 100, according to some embodiments of the disclosure, may classify categories of the plurality of objects constituting the spatial image 110. The electronic device 100 may classify to which class each of a plurality of pixels in the spatial image 110 belong by using a semantic segmentation algorithm. The semantic segmentation algorithm may be an image segmentation algorithm where each pixel of an image is labeled with a corresponding class. For example, the electronic device 100 may recognize different objects in the spatial image 110 by classifying a plurality of pixels belonging to a class of the sofa 112, a plurality of pixels belonging to a class of the chair 113, and a plurality of pixels belonging to a class of the table 115. However, the method, performed by the electronic device 100, of obtaining the relation characteristic information is merely an example. The disclosure is not limited thereto, and the electronic device 100 may use an algorithm such as object detection, panoptic segmentation, etc. to obtain the relation characteristic information.

The electronic device 100 may obtain the information about category relevance between the plurality of objects and the information about location adjacency between the plurality of objects based on information such as types of the classified classes and locations of the pixels belonging to the respective classes. For example, the electronic device 100 may obtain the information about category relevance of the objects detected in the spatial image 110 by using a table defining category relevance between the objects.

In operation S240, the electronic device 100, according to some embodiments of the disclosure, may obtain a score of a color combination by applying the color characteristic information and the relation characteristic information to a first artificial intelligence model. The first artificial intelligence model may be a model trained to estimate the score of the color combination.

A function related to artificial intelligence according to the disclosure may be operated by a processor and a memory. The processor may include one processor or a plurality of processors. The one or more processors may be a general purpose processor, such as a central processing unit (CPU), an application processor (AP), etc., a graphic exclusive processor, such as a graphics processing unit (GPU) and a vision processing unit (VPU), or a processor for artificial intelligence, such as a neural network processing unit (NPU). The one or more processors may process input data according to predefined operation rules stored in the memory or by using the artificial intelligence model. Alternatively, when the one or more processors are a processor for artificial intelligence, the processor for artificial intelligence may be designed to have a hardware structure specialized for processing of particular artificial intelligence model.

The predefined operation rules or the artificial intelligence model may be established through learning. Here, the meaning of being established through learning is that when a basic artificial intelligence model is trained by using multiple pieces of learning data by a learning algorithm, a predefined operation rules or artificial intelligence model configured to perform desired characteristics (or purposes) is generated. Such learning may be conducted in a device itself, in which artificial intelligence is performed according to the disclosure, or through a separate server and/or system. Examples of the learning algorithm may include supervised learning, unsupervised learning, semi-supervised learning or reinforcement learning, but, the learning algorithm is not limited thereto.

The artificial intelligence model may include a plurality of neural network layers. Each of the plurality of neural network layers may have a plurality of weight values and may perform neural network operations between the plurality of weight values and operation results of previous layers. The plurality of weight values of the plurality of neural network layers may be optimized by the learning result of the artificial intelligence model. For example, during the learning process, the plurality of weight values may be updated such that a loss value or cost value obtained from the artificial intelligence model is reduced or minimized. The neural network may include a deep neural network (DNN), and may further include, for example, a convolutional neural network (CNN), transformers, recurrent neural network (RNN), restricted boltzmann machine (RBM), deep belief network (DBN), bidirectional recurrent deep neural network (BRDNN) or deep Q-networks, but the neural network is not limited thereto.

The first artificial intelligence model may be trained to estimate the score of the color combination. The score of the color combination may be a numerical value of a degree of matching between two colors. In this regard, the two colors may correspond to a color included in one object and an arbitrary color. Furthermore, the score of the color combination may be the numerical value of the degree of matching between all colors in the spatial image, calculated by summing numerical values of matching between two colors in the spatial image.

The first artificial intelligence model may obtain a plurality of training images as training data. The first artificial intelligence model may obtain a co-occurrence frequency between two colors inside the plurality of training images, a combination evaluation of based on the co-occurrence frequency, a categorical importance for each interior style, etc. The first artificial intelligence model may obtain training scores of color combinations based on the co-occurrence frequency between two colors, the combination evaluation of based on the co-occurrence frequency, the categorical importance for each interior style, etc.

The first artificial intelligence model may obtain scores of color combinations of the plurality of objects in the spatial image based on training scores of the color combination. For example, the first artificial intelligence model may obtain the scores of color combinations of the plurality of objects in the spatial image by using the training images as learning data, and provide information for recommending a color of an object selected by the user so as to match the color combination of the spatial image based on the scores of the color combinations.

The first artificial intelligence model may include a plurality of neural network layers. Each of the plurality of neural network layers may have a plurality of weight values and may perform neural network operations between the plurality of weight values and operation results of previous layers.

The first artificial intelligence model may output a score of a color combination that matches the spatial image by using the color characteristic information and the relation characteristic information extracted from the plurality of objects in the spatial image. The score of the color combination may be a numerical value of a degree of matching between two colors. Furthermore, the score of the color combination may be the numerical value of the degree of matching between all colors in the spatial image, calculated by summing numerical values of matching between two colors in the spatial image. In this regard, one of the two colors may be the color of an object in the spatial image, and the other may be an arbitrary color.

For example, the first artificial intelligence model may output a high numerical color combination score of a first color matching colors of the plurality of objects in the spatial image based on the colors of the plurality of objects in the spatial image. In another example, the first artificial intelligence model may output a low numerical value color combination score of a second color that does not match the colors of the plurality of objects in the spatial image based on the colors of the plurality of objects in the spatial image.

In operation S250, the electronic device 100, according to some embodiments of the disclosure, may provide color recommendation information of a space including the plurality of objects based on the score of the color combination. For example, the electronic device 100 may select a color having a score of a color combination of a high numerical value and provide color recommendation information of the color. The color having the score of the color combination of the high numerical value may correspond to a color matching the colors of the plurality of objects in the spatial image.

Figure 3:
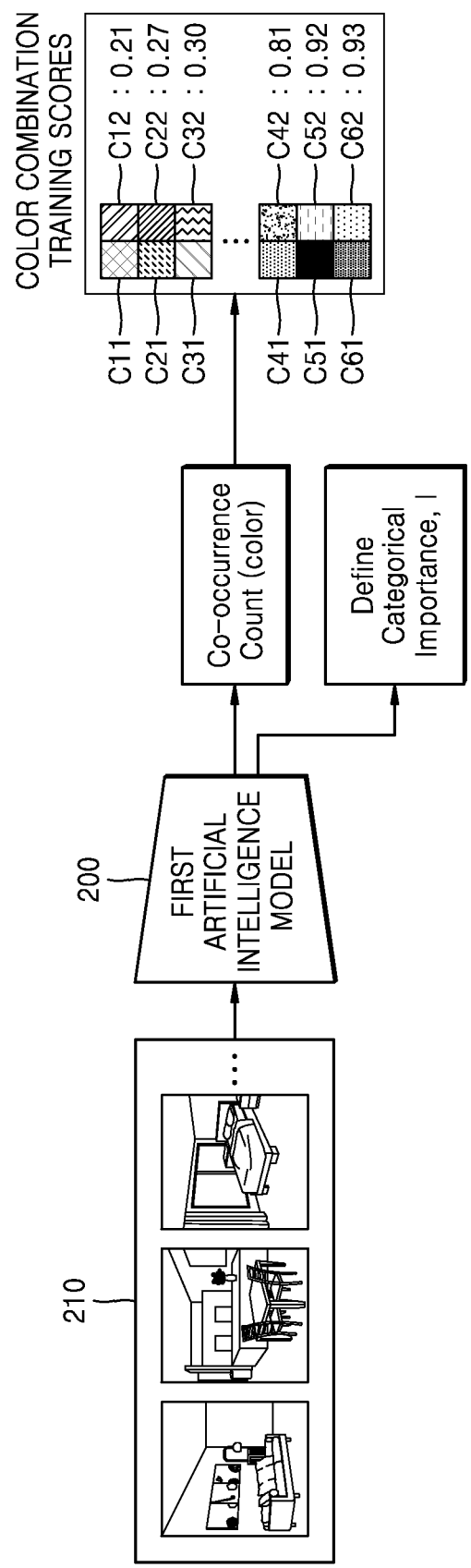
FIGS. 3 and 4 are diagrams illustrating an operation of training a first artificial intelligence model, according to various embodiments of the disclosure.
Figure 4:
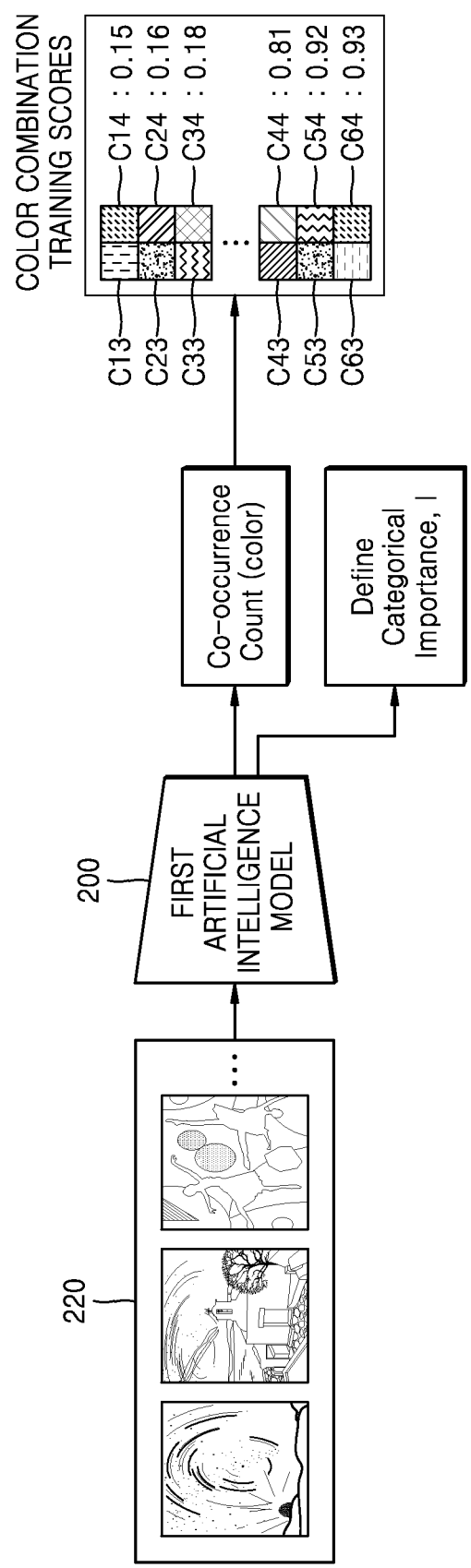

FIGS. 3 and 4 are diagrams illustrating an operation of training a first artificial intelligence model according to some embodiments of the disclosure.

Referring to FIG. 3, according to some embodiments of the disclosure, a first artificial intelligence model 200 may obtain a plurality of training images 210 as learning data.

The plurality of training images 210 may be, for example, an image of a space inside a user's house, an image of a work space, an image of a commercial space, or an image of an exhibition space. However, types of the plurality of training images 210 do not limit the disclosure.

The plurality of training images 210 may include a plurality of training objects. The plurality of training objects included in the plurality of training images 210 may be elements constituting the space, and may include furniture (e.g., bed, dressing table, mirror, etc.), home appliances (e.g., air purifier, air conditioner, TV, etc.), structures (e.g., wall, floor, door, and window), interior accessories (e.g., picture frame, carpet, calendar, flowerpot, clock, lighting, etc.), but are not limited thereto.

The first artificial intelligence model 200 may obtain the plurality of training images 210 based on a specific interior style as learning data. The first artificial intelligence model 200 may be a model trained based on the specific interior style.

The first artificial intelligence model 200 may obtain a co-occurrence count (color) with respect to the plurality of training objects in the plurality of training images 210, based on the plurality of training images 210. The co-occurrence count (color) may correspond to a simultaneous occurrence count (color) between a color pair in the plurality of training images 210. Specifically, the plurality of training images 210 may include the plurality of training objects, and each of the plurality of training objects may have a color. The co-occurrence count (color) with respect to the plurality of training objects may correspond to a co-occurrence frequency between a color pair among colors of the plurality of training objects in the plurality of training images 210.

The first artificial intelligence model 200 may obtain training scores of color combinations with respect to the plurality of training objects in the plurality of training images 210 (hereinafter, also referred to as color combination training scores) based on the co-occurrence count (color). The first artificial intelligence model 200 may obtain a color combination training score between at least a first training object and a second training object among the plurality of training objects based on the co-occurrence count (color). The color combination training score may be a numerical score of a degree of matching between a color pair among colors of the plurality of training objects. As understood by one of ordinary skill in the art, the lower the color combination training score, the lower the co-occurrence count (color) between the color pair.

The first artificial intelligence model 200, according to some embodiments of the disclosure, may obtain a color combination score between each color included in a plurality of objects in a spatial image and an arbitrary color based on the color combination training score. Specifically, the first artificial intelligence model 200 may be trained to estimate a color scheme score between a color included in an object in the spatial image and an arbitrary color according to the color combination training score, and obtain a color combination score based on the color scheme score. The electronic device 100 may also provide color recommendation information about a first object selected by a user from among the plurality of objects in the spatial image, based on the color combination score.

For example, when a 1_1-th color C11 and a 1_2-th color C12 are selected from among the colors of the plurality of training objects in the training images 210, the first artificial intelligence model 200 may be trained to estimate a color combination training score between the 1_1-th color C11 and the 1_2-th color C12 to be 0.21 based on the co-occurrence count (color) between the 1_1-th color C11 and the 1_2-th color C12.

The first artificial intelligence model 200 may be trained to estimate, for example, a color scheme score between the 1_1-th color C11 that is a color included in one object in the spatial image 110 and the 1_2-th color C12 that is an arbitrary color to be 0.21, based on the color combination training score having a numerical value of 0.21 between the 1_1-th color C11 and the 1_2-th color C12.

The first artificial intelligence model 200 may be trained to estimate a color combination training score between a 2_1-th color C21 and a 2_2-th color C22 among the colors of the plurality of training objects in the training images 210 to be 0.27, may be trained to estimate a color combination training score between a 3_1-th color C31 and a 3_2-th color C32 to be 0.30, may be trained to estimate a color combination training score between a 4_1-th color C41 and a 4_2-th color C42 to be 0.81, may be trained to estimate a color combination training score between a 5_1-th color C51 and a 5_2-th color C52 to be 0.92, and may be trained to estimate a color combination training score between a 6_1-th color C61 and a 6_2-th color C62 to be 0.93.

The first artificial intelligence model 200 may be trained to estimate a color scheme score between the 2_1-th color C21 that is a color included in one object in the spatial image 110 and the 2_2-th color C22 that is an arbitrary color to be 0.27, based on the color combination scores. The first artificial intelligence model 200 may further be trained to estimate a color scheme score between the 3_1-th color C31 that is a color included in one object in the spatial image 110 and the 3_2-th color C32 that is an arbitrary color to be 0.30, based on the color combination scores. The first artificial intelligence model 200 may further be trained to estimate a color scheme score between the 4_1-th color C41 that is a color included in one object in the spatial image 110 and the 4_2-th color C42 that is an arbitrary color to be 0.81, based on the color combination scores. The first artificial intelligence model 200 may further be trained to estimate a color scheme score between the 5_1-th color C51 that is a color included in one object in the spatial image 110 and the 5_2-th color C52 that is an arbitrary color to be 0.92, based on the color combination scores. The first artificial intelligence model 200 may further be trained to estimate a color scheme score between the 6_1-th color C61 that is a color included in one object in the spatial image 110 and the 6_2-th color C62 that is an arbitrary color to be 0.93, based on the color combination training scores.

The color scheme score between the 4_1-th color C41 and the 4_2-th color C42 is higher than the color scheme score between the 1_1-th color C11 and the 1_2-th color C12, which may correspond to the co-occurrence count (color) between the 4_1-th color C41 and the 4_2-th color C42 being higher than the co-occurrence count (color) between the 1_1-th color C11 and the 1_2-th color C12.

Furthermore, in the electronic device 100, according to some embodiments of the disclosure, the first artificial intelligence model 200 may obtain categorical importance based on the plurality of training images 210. The categorical importance may be graded according to, for example, an expert's knowledge. Furthermore, the categorical importance may be graded, for example, based on the processor performing a data statistics analysis. Based on the data statistics analysis, a higher grade of categorical importance may be given to an object that is more essential in the space of the user's house, and a lower grade of categorical importance may be given to an object that is additionally used.

For example, because a refrigerator corresponds to an essential home appliance in the space of the user's house, and a picture frame is an interior accessory that is additively disposed to decorate the house space, the categorical importance of the refrigerator may be higher than the categorical importance of the frame.

The first artificial intelligence model 200 may obtain the plurality of training images 210 based on a specific interior style as learning data. For example, the first artificial intelligence model 200 may obtain the plurality of training images 210 based on a modern interior style as learning data. The first artificial intelligence model 200 may obtain training scores of color combinations by using the training images 210 based on the modern interior style. The first artificial intelligence model 200 trained through the plurality of training images 210 based on the modern interior style may obtain a score of a color combination based on the modern interior style and based on the training scores of the color combinations.

As another example, the first artificial intelligence model 200 may obtain the plurality of training images 210 based on an industrial interior style as learning data. The first artificial intelligence model 200 may obtain training scores of color combinations by using the plurality of training images 210 based on the industrial interior style. The first artificial intelligence model 200 trained through the plurality of training images 210 based on the industrial interior style may obtain a score of a color combination based on the industrial interior style, based on the training scores of color combinations.

For example, the color combination score between the 1_1-th color C11 and the 1_2-th color C12 obtained through the first artificial intelligence model 200 trained based on the modern interior style may be different from the color combination score between the 1_1-th color C11 and the 1_2-th color C12 obtained through the first artificial intelligence model 200 trained based on the industrial interior style.

For convenience of descriptions, redundant descriptions with those given with reference to FIG. 3 are briefly provided or omitted.

Referring to FIG. 4, a plurality of training images 220 may be a work of art including a plurality of training objects.

The plurality of training objects included in the plurality of training images 220 are elements constituting the work of art, and may include objects in still life paintings (e.g., flowers, fruits, dead meat and birds, musical instruments, books, tableware, etc.), nature landscapes in landscape paintings (e.g., sky, trees, mountains, rivers, roads, grass, clouds, etc.), and elements in the portraits (e.g., headbands, pupils, forehead, cheeks, tops worn by characters, ties, solid backgrounds, masks, etc.), but are not limited thereto.

In the electronic device 100, according to some embodiments of the disclosure, the first artificial intelligence model 200 may obtain the plurality of training images 220 that are works of art as learning data. The first artificial intelligence model 200 may be a model trained based on a style of the work of art.

The first artificial intelligence model 200 may obtain a co-occurrence count (color) with respect to the plurality of training objects in the plurality of training images 220, based on the plurality of training images 220 that are works of art. The first artificial intelligence model 200 may obtain color combination training scores of the plurality of training objects in the plurality of training images 220 that are works of art, based on the co-occurrence count (color).

As an example, the first artificial intelligence model 200 may select a 1_3-th color C13 and a 1_4-th color C14 from among colors of the plurality of training objects in the training images 220. The first artificial intelligence model 200 may be trained to estimate a color combination training score to be 0.15 between the 1_3-th color C13 and the 1_4-th color C14 based on a co-occurrence count (color) between the 1_3-th color C13 and the 1_4-th color C14. As understood by one of ordinary skill in the art, the lower the color combination training score between the 1_3-th color C13 and the 1_4-th color C14, the lower the co-occurrence count (color) between the 1_3-th color C13 and the 1_4-th color C14.

The first artificial intelligence model 200 may be trained to estimate a color scheme score between the 1_3-th color C13 that is a color included in one object in the spatial image 110 and the 1_4-th color C14 that is an arbitrary color to be 0.15, based on the color combination training score having a numeral value of 0.15 between the 1_3-th color C13 and the 1_4-th color C14.

Similarly, the first artificial intelligence model 200 may determine 0.16 as a color combination training score between a 2_3-th color C23 and a 2_4-th color C24 among colors of the plurality of training objects in the training images 220. The first artificial intelligence model 200 may determine 0.18 as a color combination training score between a 3_3-th color C33 and a 3_4-th color C34 among colors of the plurality of training objects in the training images 220. The first artificial intelligence model 200 may determine 0.81 as a color combination training score between a 4_3-th color C43 and a 4_4-th color C44 among colors of the plurality of training objects in the training images 220. The first artificial intelligence model 200 may determine 0.92 as a color combination training score between a 5_3-th color C53 and a 5_4-th color C54 among colors of the plurality of training objects in the training images 220. The first artificial intelligence model 200 may determine 0.93 as a color combination training score between a 6_3-th color C63 and a 6_4-th color C64 among colors of the plurality of training objects in the training images 220.

The first artificial intelligence model 200 may be trained to estimate a color scheme score between the 2_3-th color C23 that is a color included in one object in the spatial image 110 and the 2_4-th color C24 that is an arbitrary color to be 0.16, based on the color combination training scores. The first artificial intelligence model 200 may be trained to estimate a color scheme score between the 3_3-th color C33 that is a color included in one object in the spatial image 110 and the 3_4-th color C34 that is an arbitrary color to be 0.18, based on the color combination training scores. The first artificial intelligence model 200 may be trained to estimate a color scheme score between the 4_3-th color C43 that is a color included in one object in the spatial image 110 and the 4_4-th color C44 that is an arbitrary color to be 0.81, based on the color combination training scores. The first artificial intelligence model 200 may be trained to estimate a color scheme score between the 5_3-th color C53 that is a color included in one object in the spatial image 110 and the 5_4-th color C54 that is an arbitrary color to be 0.92, based on the color combination training scores. The first artificial intelligence model 200 may be trained to estimate a color scheme score between the 6_3-th color C63 that is a color included in one object in the spatial image 110 and the 6_4-th color C64 that is an arbitrary color to be 0.93, based on the color combination training scores.

The color scheme score between the 4_3-th color C43 and the 4_4-th color C44 is higher than the color scheme score between the 1_3-th color C13 and the 1_4-th color C14, which may correspond to the co-occurrence count (color) between the 4_3-th color C43 and the 4_4-th color C44 being higher than the co-occurrence count (color) between the 1_3-th color C13 and the 1_4-th color C14.

Furthermore, in the electronic device 100, according to some embodiments of the disclosure, the first artificial intelligence model 200 may obtain categorical importance based on the plurality of training images 220. The categorical importance may be graded according to an expert's knowledge, or according to an analysis performed by the processor. The categorical importance may be compared to the objects in the training images 220, and a high grade may be given to an object that occupies a large proportion or is the center. For example, in the case of a work of art, a high grade of categorical importance may be given to an object occupying a large area.

Figure 5:
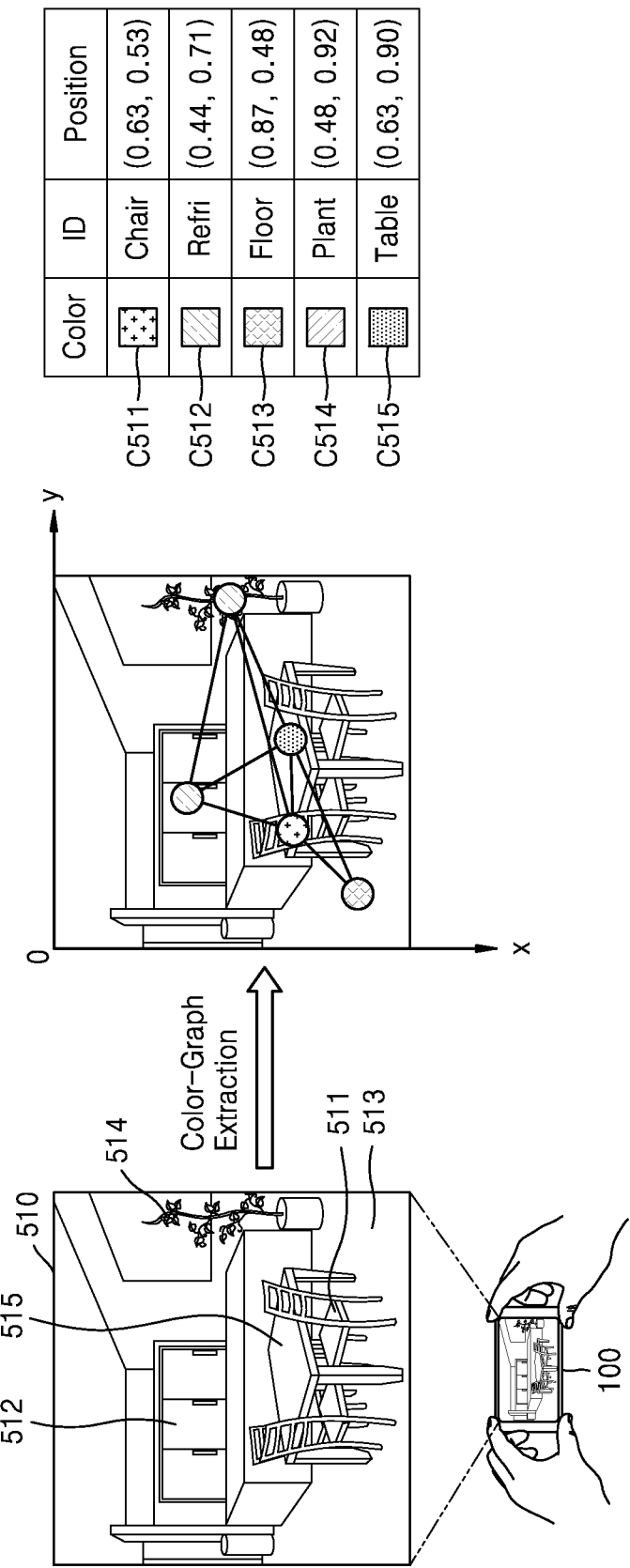
FIGS. 5 and 6 are diagrams illustrating an operation of providing color recommendation information by using a trained first artificial intelligence model, according to various embodiments of the disclosure.
Figure 6:
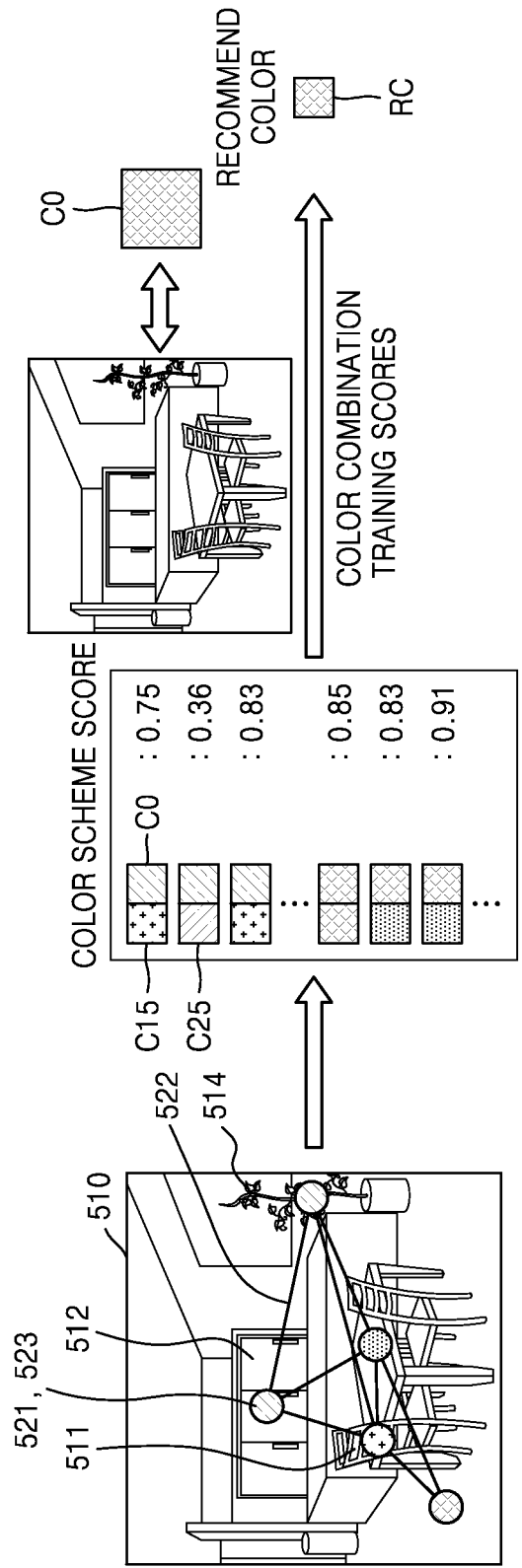

FIGS. 5 and 6 are diagrams illustrating an operation of providing color recommendation information by using a trained first artificial intelligence model, according to some embodiments of the disclosure.

For reference, FIG. 6 is a diagram illustrating color characteristic information 521, relation characteristic information 522, and object characteristic information 523 obtained from a spatial image 510.

Referring to FIG. 5, the electronic device 100, according to some embodiments of the disclosure, may obtain the color characteristic information 521 from a plurality of objects included in the spatial image 510.

The spatial image 510 may include a plurality of objects, for example, a chair 511, a refrigerator 512, a floor 513, a plant 514, and a table 515, and FIG. 5 is described based on the chair 511, the refrigerator 512, the floor 513, the plant 514, the table 515 among the plurality of objects included in the spatial image 510.

The color characteristic information 521 may be information about colors included in the plurality of objects in the spatial image 510. In FIG. 5, the color characteristic information 521 indicates information corresponding to the refrigerator 512, but is not limited thereto. For example, the color characteristic information 521 may be information corresponding to the floor 513 or information corresponding to the plant 514.

The electronic device 100, according to some embodiments of the disclosure, may determine types of colors of the plurality of objects constituting the spatial image 510. For example, the electronic device 100 may cluster pixels having similar colors in the spatial image 510 into N clusters by using a k-means clustering algorithm, and determine the types of colors of the plurality of objects constituting the spatial image 110 based on the clustered pixels. However, the method, performed by the electronic device 100, of obtaining the color characteristic information is merely an example, and the disclosure is not limited thereto.

Based on the spatial image 510, the electronic device 100 may determine a first color C511 corresponding to the chair 511, a second color C512 corresponding to the refrigerator 512, a third color C513 corresponding to the floor 513, a fourth color C514 corresponding to the plant 514, and a fifth color C515 corresponding to the table 515.

The electronic device 100, according to some embodiments of the disclosure, may further obtain the object characteristic information 523 including information about types or positions of the plurality of objects constituting the spatial image 510. The electronic device 100 may classify the objects by classifying to which class each of a plurality of pixels in the spatial image 510 belong by using a semantic segmentation algorithm, This method of classifying the objects is only an example and does not limit the disclosure.

The electronic device 100 may classify classes of the chair 511, the refrigerator 512, the floor 513, the plant 514, and the table 515 based on the spatial image 510. Furthermore, the electronic device 100 may determine the position of the chair 511 by calculating an average position of the plurality of pixels belonging to the class of the chair 511 based on the spatial image 510. Similarly, the electronic device 100 may determine the position of the refrigerator 512, the position of the floor 513, the position of the plant 514, and the position of the table 515 based on the spatial image 510.

For example, as shown in FIG. 5, the electronic device 100 may obtain object characteristic information including information that a category of one object in the spatial image 510 is a chair and information that a position of the chair 511 corresponds to coordinates (0.63, 0.53), and color characteristic information including information about the first color C511 corresponding to the chair 511, based on the spatial image 510.

Similarly, the electronic device 100 may obtain object characteristic information including information that the category of one object in the spatial image 510 is a refrigerator and information about that a position of the refrigerator 512 corresponds to on coordinates (0.44, 0.71), and color characteristic information including information about the second color C512 corresponding to the refrigerator 512, based on the spatial image 510.

Similarly, the electronic device 100 may obtain object characteristic information and color characteristic information about each of the floor 513, the plant 514, and the table 515, based on the spatial image 510.

The electronic device 100, according to some embodiments of the disclosure, may further obtain the relation characteristic information 522 from a plurality of objects included in the spatial image 510.

The relation characteristic information 522 may be information defining a relation between the plurality of objects in the spatial image 510. The relation characteristic information 522 may be information defining a relation between any two objects among the plurality of objects. In FIG. 5, the relation characteristic information 522 may indicate information defining a relation between the refrigerator 512 and the plant 514, but is not limited thereto. For example, the relation characteristic information 522 may be information defining a relation between the chair 511 and the table 515.

The relation characteristic information 522 may include at least one of information about position adjacency between the plurality of objects or information about category relevance between the plurality of objects. For reference, the relation characteristic information 522 may be described based on the relation between the refrigerator 512 and the plant 514.

The information about position adjacency between the plurality of objects may be information about whether at least two or more objects among the plurality of objects are adjacent, and may be determined based on a distance between the objects. For example, the electronic device 100 may determine information about a distance between the refrigerator 512 and the plant 514 based on information about positions of the refrigerator 512 and the plant 514. Based on the information about the distance between the refrigerator 512 and the plant 514, the electronic device 100 may obtain information that the refrigerator 512 and the plant 514 are adjacent to each other in terms of position.

Whether two objects are adjacent to each other may be determined by comparing a certain reference distance and a distance between two objects. However this method of determining adjacency is only an example, and the disclosure is not limited thereto. For example, because the distance between the refrigerator 512 and the plant 514 is shorter than the distance between the refrigerator 512 and the floor 513, the distance between the refrigerator 512 and the plant 514 may be determined to be relatively adjacent to each other.

The information about the category relevance between the plurality of objects may be information about a degree of relevance between categories of at least two or more objects among the plurality of objects, and may be determined based on categories of the objects. The degree of relevance between the categories may be determined in consideration of the purpose and time of use of the plurality of objects, a space in which the plurality of objects are mainly arranged, etc.

For reference, FIG. 6 is a diagram illustrating an operation of obtaining color recommendation information based on color characteristic information and relation characteristic information.

Referring to FIG. 6, the electronic device 100, according to some embodiments, may obtain a color combination score between each color included in the plurality of objects in the spatial image 510 and an arbitrary color by applying the color characteristic information 521 and the relation characteristic information 522 to the first artificial intelligence model 200.

The electronic device 100 may obtain the color combination score between each color included in the plurality of objects in the spatial image 510 and the arbitrary color by applying the color characteristic information 521 to the first artificial intelligence model 200. The first artificial intelligence model 200 may obtain a color scheme score according to the color combination training score, and may obtain a color combination score based on the color scheme score. The first artificial intelligence model 200 may output a color scheme score proportional to co-occurrence count (color) obtained based on the training images 210. The color scheme score may be a numerical score of a degree of matching between colors C15, C25, etc. of one object included in the spatial image 510 and arbitrary colors C0 to be recommended to other objects.

For example, the chair 511 in the spatial image 510 may have a 1_5-th color C15. The electronic device 100 may obtain a color scheme score of the 1_5-th color C15 and the arbitrary color C0. As shown in FIG. 6, the color scheme score of the 1_5-th color C15 and the arbitrary color C0 may be 0.75. The color scheme score may make the degree of matching between two colors correspond to a range of 0 to 1, but the range of the color scheme score is only an example, and the disclosure is not limited thereto.

As another example, the plant 514 in the spatial image 510 may have a 2_5-th color C25. The electronic device 100 may obtain a color scheme score of the 2_5-th color C25 and the arbitrary color C0. As shown in FIG. 6, the color scheme score of the 2_5-th color C25 and the arbitrary color C0 may be 0.36.

The electronic device 100 may obtain color combination scores of the plurality of objects in the spatial image 510 by further applying the relation characteristic information 522 and the object characteristic information 523 to the first artificial intelligence model 200.

The color combination score may be a numerical value of a degree of matching between each color in the spatial image 510 and the arbitrary color C0, calculated by summing matching values between the two colors. According to some embodiments of the disclosure, the first artificial intelligence model 200 may be trained to estimate a color combination score calculated by summing matching values between two colors.

The color combination score may be calculated as the sum of color scheme scores between one color included in the spatial image 510 and the arbitrary colors C0 to be recommended. For example, the color combination score may be calculated by summing a color scheme score between the arbitrary color C0 and a 1_5-th color C1_5 of the chair 511, a color scheme score between the arbitrary color C0 and a 1_6-th color C1_6 of the refrigerator 512, a color scheme score between the arbitrary color C0 and a 2_5-th color C2_5 of the plant 514, etc. Accordingly, the color combination score may be a numerical value of the degree of whether the arbitrary colors C0 generally match colors of the plurality of objects in the spatial image 510.

According to some embodiments of the disclosure, the color combination score may be calculated by summing the color scheme scores based on categorical importance. The categorical importance may be graded based on the relation characteristic information 522 and the object characteristic information 523. For example, in relation to an arbitrary object for which a color is to be recommended, categorical importance may be evaluated with higher relevance in the case of an object having a position adjacent to the arbitrary object or an object having high category relevance. Furthermore, when the category of an object is furniture essential to be used in a space of the user's house or the object is positioned at the center of the space of the user's house, the categorical importance may be evaluated with higher relevance. The categorical importance may be evaluated according to the expert's knowledge or may be evaluated based on data statistical analysis performed by the processor, and does not limit the disclosure.

For example, the color combination score may be calculated as the sum of a product of the color scheme score between the arbitrary color C0 and the 1_5-th color C1_5 of the chair 511 and the categorical importance of the chair 511, the product of the color scheme score between the arbitrary color C0 and the 1_6-th color C1_6 of the refrigerator 512 and the categorical importance of the refrigerator 512, etc. Accordingly, the color combination score may be a score of a numerical value of the degree of whether the arbitrary colors C0 generally match the colors of the plurality of objects in the spatial image 510, while specifically considering a degree of matching with an object of high importance.

The electronic device 100 may determine a color having a high color combination score with respect to the spatial image 510 among the arbitrary colors C0 as a recommendation color RC, and provide color recommendation information corresponding to the recommendation color RC.

The color combination score may be a numerical value of a degree of matching between all colors in a spatial image, calculated based on the color scheme score. The color combination score may be calculated based on a product of a color scheme score between a color of one object included in the spatial image 510 and an arbitrary color to be recommended to another object, and categorical importance of the object included in the space 510. A method of obtaining the color combination score may be expressed as, for example, in accordance with Equation 1.

$$R = \Sigma I \times \bar{r} \quad \text{[Equation 1]}$$

Here, R is expressed as a color combination score in the disclosure.

Here, I corresponds to categorical importance of one object included in the spatial image 510.

Here, $\bar{r}$ corresponds to an average of color scheme scores between the color of the object included in the spatial image 510 in the disclosure and an arbitrary color to be recommended to another object. Accordingly, $\bar{r}$ corresponds to a value obtained by averaging color scheme scores between an arbitrary color to be recommended and a color of each object included in the spatial image 510.

According to Equation 1, the higher the categorical importance, the higher the color scheme score of the object may be reflected to the color combination score. For example, the color combination score may be a score reflecting a degree of matching between a color of an object having high categorical importance and an arbitrary color to be recommended at a high proportion.

The method of calculating the color combination score is only an example, and the disclosure is not limited thereto.

Figure 7:
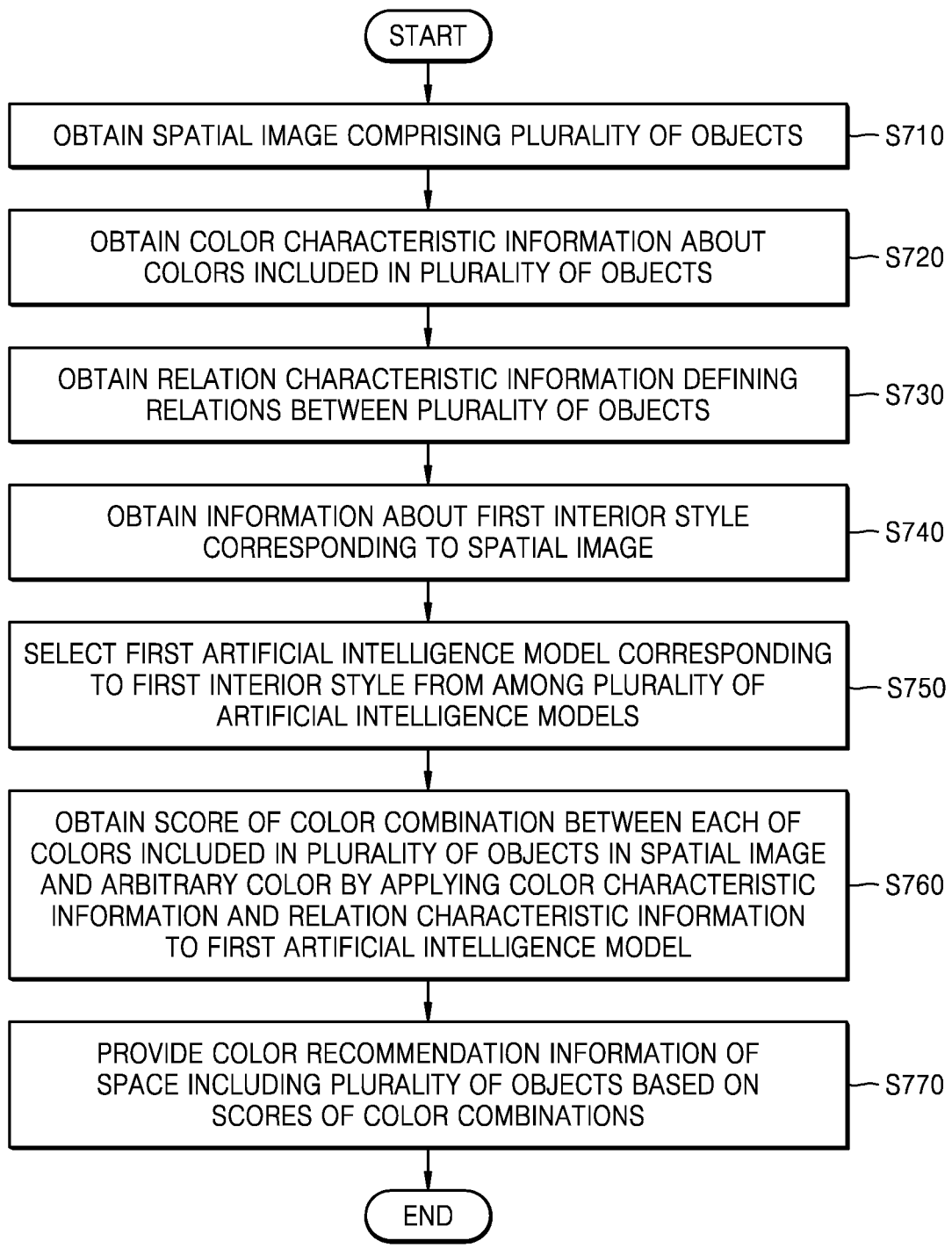
FIG. 7 is a flowchart illustrating a method of selecting an artificial intelligence model corresponding to a specific interior style, according to various embodiments of the disclosure.

FIG. 7 is a flowchart illustrating a method of selecting an artificial intelligence model corresponding to a specific interior style according to some embodiments of the disclosure.

For convenience of descriptions, redundant descriptions with those given with reference to FIGS. 1 to 6 are briefly provided or omitted.

Referring to FIG. 7, in operation S710, the electronic device 100, according to some embodiments of the disclosure, may obtain a spatial image including a plurality of objects.

In operation S720, the electronic device 100, according to some embodiments of the disclosure, may obtain color characteristic information of colors included in the plurality of objects.

In operation S730, the electronic device 100, according to some embodiments of the disclosure, may obtain relation characteristic information defining relations between the plurality of objects.

In operation S740, the electronic device 100, according to some embodiments of the disclosure, may obtain information about a first interior style corresponding to a spatial image.

For example, the spatial image may be an image of a space in a user's house decorated in a modern interior style. The electronic device 100 may obtain information about the modern interior style corresponding to the spatial image.

In operation S750, the electronic device 100, according to some embodiments of the disclosure, may select a first artificial intelligence model corresponding to a first interior style from among a plurality of artificial intelligence models.

Each of the plurality of artificial intelligence models may be a model corresponding to a specific interior style. The first artificial intelligence model corresponding to the first interior style among the plurality of artificial intelligence models may be a model trained based on a training image of a space in the user's house decorated in the first interior style. Accordingly, the first artificial intelligence model may obtain a color combination score based on the first interior style.

The electronic device 100 may select the first artificial intelligence model corresponding to the first interior style in order to obtain a color combination score based on the first interior style.

For example, the first artificial intelligence model corresponding to the modern interior style among the plurality of artificial intelligence models may be a model trained based on a training image of the space in the user's house decorated in the modern interior style. Accordingly, the first artificial intelligence model may obtain a color combination score based on the modern interior style.

The electronic device 100 may select the first artificial intelligence model corresponding to the modern interior style in order to obtain the color combination score based on the modern interior style.

In operation S760, the electronic device 100 according to some embodiments of the disclosure may obtain a score of a color combination between each of colors included in the plurality of objects in the spatial image and an arbitrary color by applying the color characteristic information and the relation characteristic information to the first artificial intelligence model.

The first artificial intelligence model trained based on the first interior style may obtain a color combination score based on the first interior style. The electronic device 100 may obtain scores of color combinations of the plurality of objects in the spatial image by applying the color characteristic information and the relation characteristic information to the first artificial intelligence model.

In operation S770, the electronic device 100 according to some embodiments of the disclosure, may provide color recommendation information of a space including the plurality of objects based on the scores of color combinations.

Figure 8:
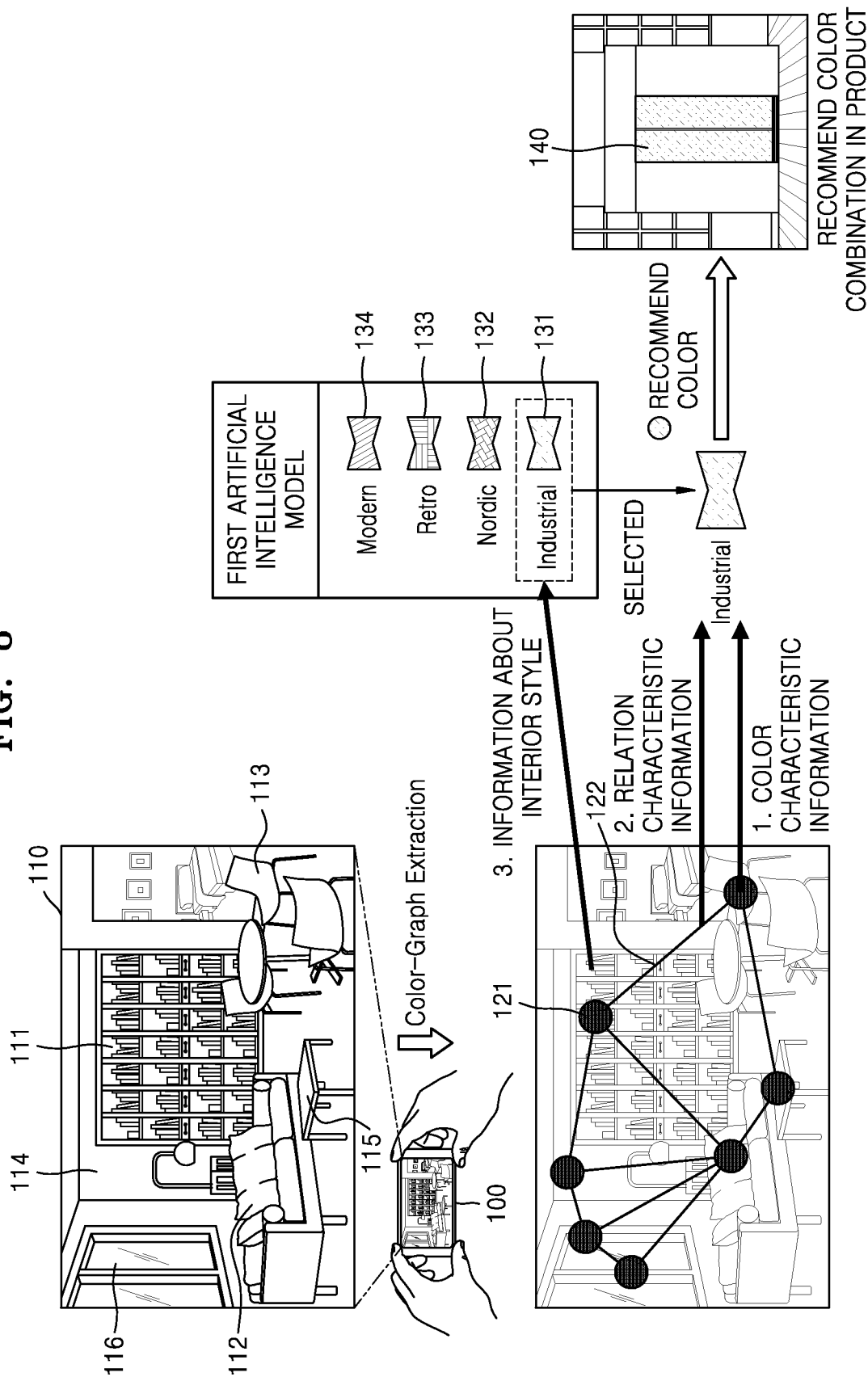
FIG. 8 is a diagram illustrating an operation of providing color recommendation information according to various embodiments of the disclosure.

FIG. 8 is a diagram illustrating an operation of providing color recommendation information according to some embodiments of the disclosure.

For convenience of descriptions, redundant descriptions with those given with reference to FIG. 1 are briefly provided or omitted.

Referring to FIG. 8, the electronic device 100, according to some embodiments of the disclosure, may obtain the spatial image 110 including a plurality of objects.

The electronic device 100 may obtain the spatial image 110 by using at least one camera. The electronic device 100 may receive the spatial image 110 from an external electronic device.

The electronic device 100, according to some embodiments of the disclosure, may obtain the color characteristic information 121 and the relation characteristic information 122 from the plurality of objects included in the spatial image 110 (Color-Graph Extraction).

The electronic device 100, according to some embodiments of the disclosure, may select a suitable artificial intelligence model so as to recommend a color matching a space in which the spatial image 110 is obtained. The electronic device 100 may recommend the color matching the space in which the spatial image 110 is obtained by applying the color characteristic information 121 and the relation characteristic information 122 to the selected artificial intelligence model.

Here, the electronic device 100, according to some embodiments of the disclosure, may obtain information about the first interior style corresponding to the spatial image 110 among the plurality of interior styles, and the selected artificial intelligence model may be the first artificial intelligence model corresponding to the interior style among the plurality of artificial intelligence models. The first artificial intelligence model may be a model trained through a plurality of training images corresponding to the first interior style.

For example, the first artificial intelligence model may include second artificial intelligence model to fifth artificial intelligence model 131, 132, 133, and 134, but the type of the first artificial intelligence model does not limit the disclosure.

The second artificial intelligence model 131 may be an artificial intelligence model trained through a plurality of training images corresponding to an industrial interior style. Accordingly, the second artificial intelligence model 131 may obtain a color combination score based on the industrial interior style.

The third artificial intelligence model 132 may be an artificial intelligence model trained through a plurality of training images corresponding to a Nordic interior style, the fourth artificial intelligence model 133 may be an artificial intelligence model trained through a plurality of training images corresponding to a retro interior style, and the fifth artificial intelligence model 134 may be an artificial intelligence model trained through a plurality of training images corresponding to the modern interior style.

The electronic device 100, according to some embodiments of the disclosure, may obtain a color matching a space obtained by the spatial image 110 based on the industrial interior style by applying the color characteristic information 121 and the relation characteristic information 122 to the selected artificial intelligence model, for example, the second artificial intelligence model 131.

Figure 9:
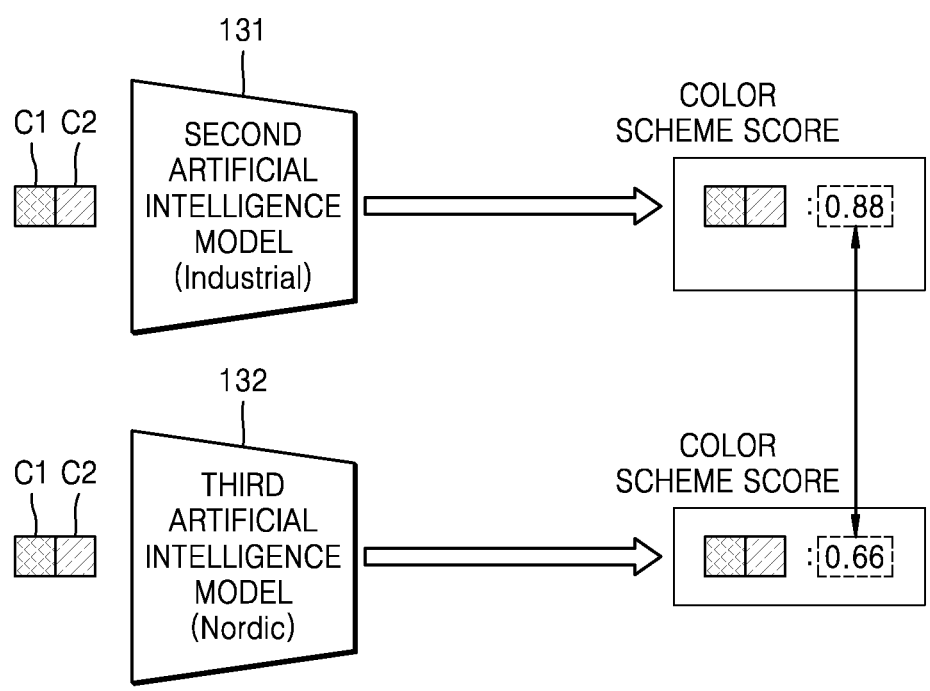
FIG. 9 is a diagram illustrating an artificial intelligence model providing color recommendation information, according to various embodiments of the disclosure.

FIG. 9 is a diagram illustrating an artificial intelligence model providing color recommendation information according to some embodiments of the disclosure.

Referring to FIG. 9, the electronic device 100, according to some embodiments of the disclosure, may obtain a color scheme score with respect to a color combination between a color included in one object in a spatial image and an arbitrary color by applying the color characteristic information 121 to the second artificial intelligence model 131 or the third artificial intelligence model 132. The electronic device 100 may select one of the second artificial intelligence model 131 and the third artificial intelligence model 132 so as to apply the color characteristic information 121.

According to some embodiments of the disclosure, the electronic device 100 may select the second artificial intelligence model 131. The second artificial intelligence model 131 may be a model trained based on a training image of a space in a user's house decorated in an industrial interior style. The second artificial intelligence model 131 may be a model corresponding to the industrial interior style among a plurality of artificial intelligence models.

The electronic device 100 may obtain the color scheme score with respect to the color combination between the color included in one object in the spatial image and the arbitrary color by applying color characteristic information of a sixth color C1 and a seventh color C2 to the second artificial intelligence model 131. Here, the color included in one object may be the sixth color C1, and the arbitrary color may be the seventh color C2. For example, as shown in FIG. 9, the second artificial intelligence model 131 may be a model trained to estimate a color scheme score between the sixth color C1 and the seventh color C2 to be 0.88.

According to some embodiments of the disclosure, the electronic device 100 may select the third artificial intelligence model 132. The third artificial intelligence model 132 may be a model trained based on a training image of a space in a user's house decorated in a Nordic interior style. The third artificial intelligence model 132 may be a model corresponding to the Nordic interior style among a plurality of artificial intelligence models. The third artificial intelligence model 132 may be a model recommending a color by evaluating importance of a furniture color with higher relevance.

The electronic device 100 may obtain the color scheme score with respect to the color combination between the color included in one object in the spatial image and the arbitrary color by applying the color characteristic information of the sixth color C1 and the seventh color C2 to the third artificial intelligence model 132. For example, as shown in FIG. 9, the third artificial intelligence model 132 may be a model trained to estimate a color scheme score between the sixth color C1 and the seventh color C2 to be 0.66.

For example, the second artificial intelligence model 131 and the third artificial intelligence model 132 corresponding to different interior styles may obtain different color scheme scores between the sixth color C1 and the seventh color C2, even when receiving the same color characteristic information of the sixth color C1 and the seventh color C2.

Furthermore, as shown in FIG. 9, the color scheme score between the sixth color C1 and the seventh color C2 determined by the second artificial intelligence model 131 is higher than the color scheme score between the sixth color C1 and the seventh color C2 determined by the third artificial intelligence model 132, and thus, the combination between the sixth color C1 and the seventh color C2 may be evaluated to have a high degree of matching in terms of the industrial interior style.

Figure 10:
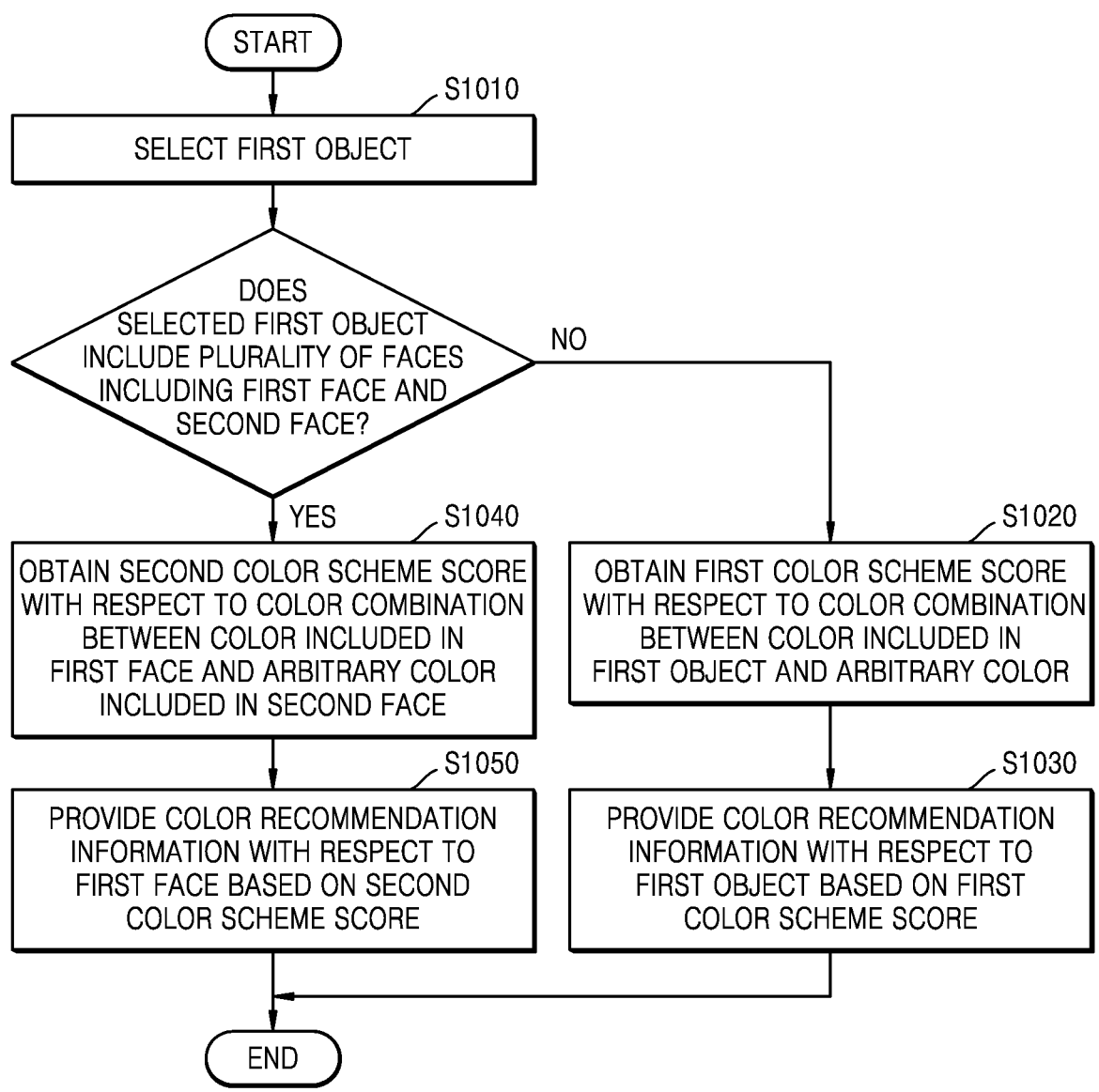
FIG. 10 is a flowchart illustrating a method of providing color recommendation information, according to various embodiments of the disclosure.

FIG. 10 is a flowchart illustrating a method of providing color recommendation information according to some embodiments of the disclosure.

Referring to FIG. 10, in operation S1010, the electronic device 100 according to some embodiments of the disclosure may select a first object to which a color is to be applied according to the color recommendation information. The first object may be an object included in the spatial image 110, but may also be an object not included in the spatial image 110.

As a result, the electronic device 100, according to some embodiments of the disclosure, may provide color recommendation information for recommending a color of the first object included in the spatial image 110, and may provide color recommendation information for recommending a color of the first object not included in the spatial image 110.

In operation S1020, when the selected first object does not include a plurality of faces including a first face and a second face (e.g., "NO"), the electronic device 100, according to some embodiments, may obtain a first color scheme score with respect to a color combination between a color included in the first object and an arbitrary color. Furthermore, the electronic device 100 may obtain a score of a color combination for providing color recommendation information of an object selected by a user from among a plurality of objects, based on the first color scheme score.

The second object may be an object included in the spatial image 110. The second object may be one of a plurality of objects in the spatial image 110 described with reference to FIG. 2.

The electronic device 100 may obtain color characteristic information about an arbitrary color to be recommended to the first object and a color included in the second object, and may obtain relation characteristic information defining a relation between the first object and the second object. The electronic device 100 may obtain a score of a color combination by applying the color characteristic information of the first object and the second object and the relation characteristic information of the first object and the second object to a first artificial intelligence model. The score of the color combination may be a numerical value of a degree of matching between a color of the first object and a color of the second object.

In operation S1030, the electronic device 100, according to some embodiments of the disclosure, may provide color recommendation information with respect to the first object based on the score of the color combination.

In operation S1040, when the selected first object includes the plurality of faces including the first face and the second face (e.g., "YES"), according to some embodiments of the disclosure, the first artificial intelligence model may be trained to estimate a second color scheme score with respect to a color combination between a color included in the first face and arbitrary color included in the second face, based on training scores with respect to color combinations. The electronic device 100 may obtain a color combination score for providing color recommendation information with respect to the second face of the first object, based on the second color scheme score.

The electronic device 100 may obtain color characteristic information about colors included in the first face and the second face. The electronic device 100 may obtain the second color scheme score by applying the color characteristic information of the first face and the second face to the first artificial intelligence model. The second color scheme score may be a numerical value of a degree of matching between an arbitrary color of the first face and a color of the second face in the first object.

In operation S1050, the electronic device 100, according to some embodiments of the disclosure, may provide the color recommendation information with respect to the first face, based on the score of the color combination.

Figure 11:
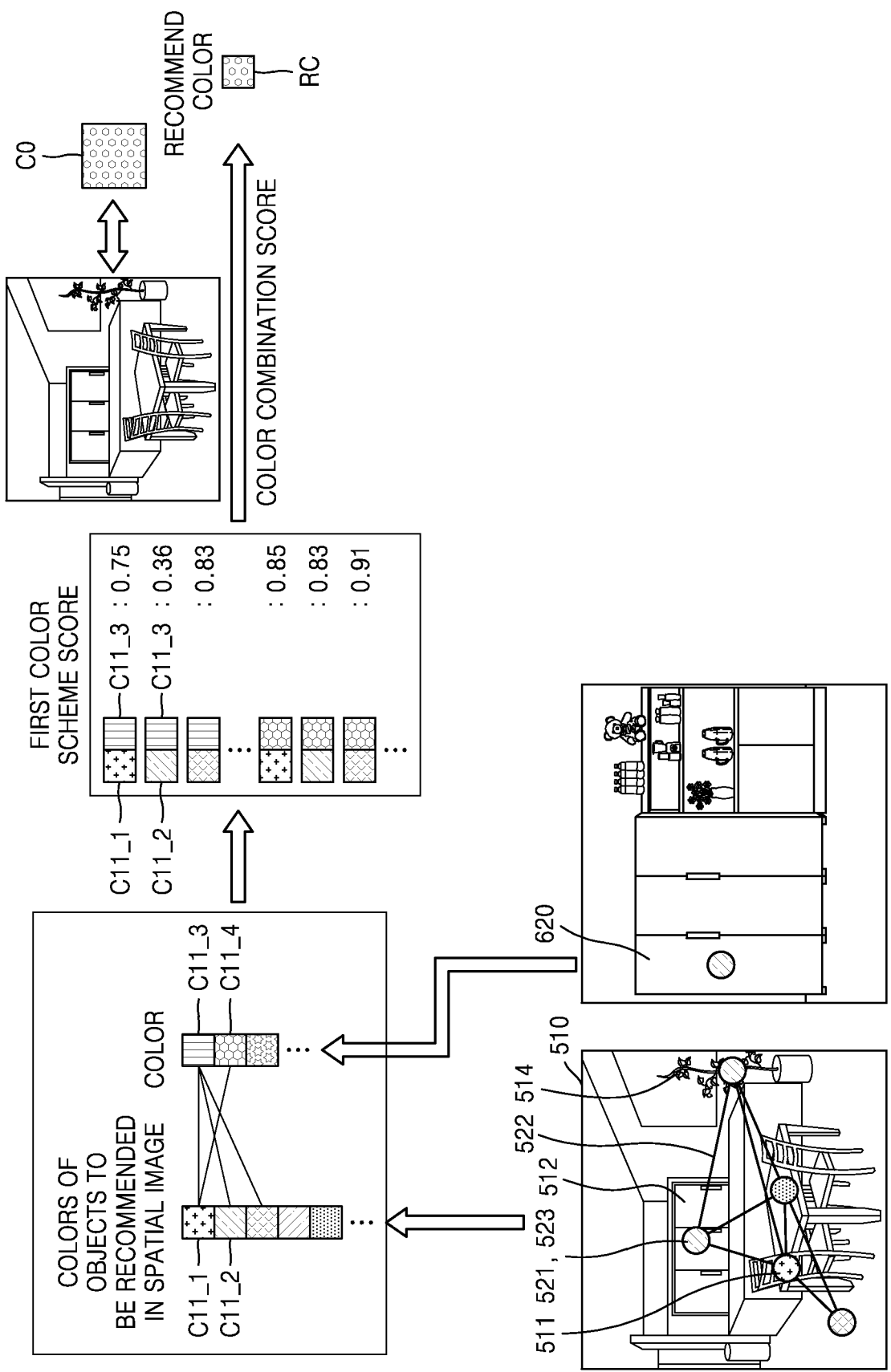
FIGS. 11 and 12 are diagrams illustrating various operations of providing color recommendation information, according to various embodiments of the disclosure.
Figure 12:
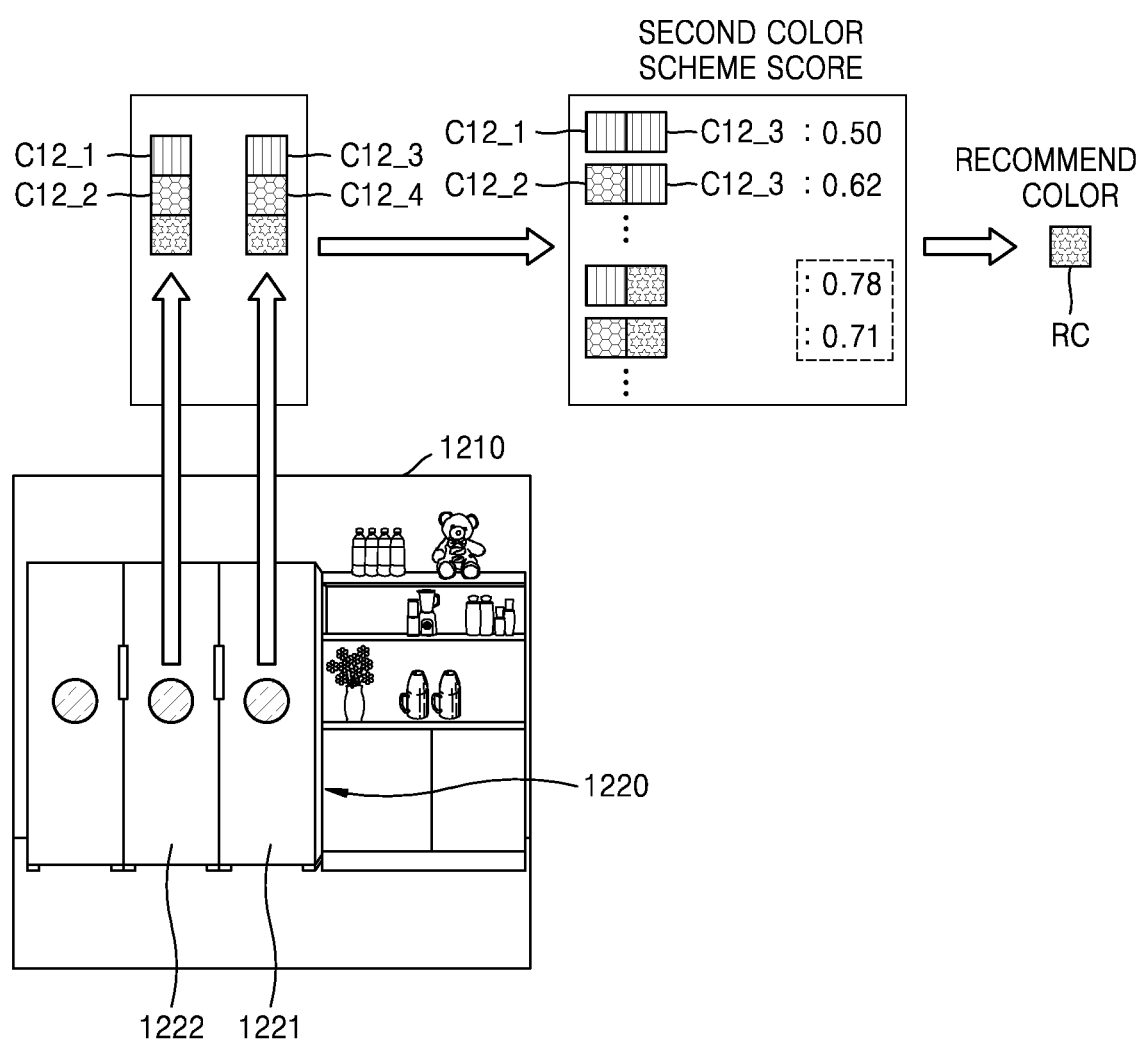

FIGS. 11 and 12 are diagrams illustrating various operations of providing color recommendation information according to some embodiments of the disclosure.

For reference, FIG. 11 is a diagram illustrating in detail operations of operations S1020 and S1030 of FIG. 10, and FIG. 12 is a diagram illustrating in detail operations of operations S1040 and S1050 of FIG. 10. Redundant descriptions with those given with reference to FIG. 6 are briefly provided or omitted.

Referring to FIG. 11, the electronic device 100, according to some embodiments of the disclosure, may obtain a first color scheme score between an arbitrary color included in a first object and a color included in a second object, and provide color recommendation information with respect to the first object based on the first color scheme score.

The electronic device 100 may obtain first color scheme scores between colors included in a plurality of objects in the spatial image 510 and an arbitrary color by applying the color characteristic information 521 to the first artificial intelligence model 200. The color characteristic information 521 may include information about various colors to be recommended to an arbitrary object 620.

Accordingly, the electronic device 100 may obtain the first color scheme scores between colors C11_1, C11_2, etc., of a plurality of objects in the spatial image 510 and colors C11_3, C11_4, etc., to be recommended to the arbitrary object 620. The first color scheme scores may be numerical scores of degree of matching between the colors C11_1, C11_2, etc., of the plurality of objects in the spatial image 510 and the colors C11_3, C11_4, etc., to be recommended to the arbitrary object 620.

For example, the chair 511 in the spatial image 510 may have the 11_1-th color C11_1, and the colors C11_3, C11_4, etc., to be recommended to the arbitrary object 620 may be arbitrarily selected. As illustrated in FIG. 11, the first color scheme score of the 11_1-th color C11_1 and the 11_3-th color C11_3 may be 0.75. The first color scheme scores may correspond to a degree of matching between two colors in a range of 0 to 1, but the range of the first color scheme scores is only an example, and the disclosure is not limited thereto.

As another example, the plant 514 may have a 11_2-th color C11_2, and the colors C11_3, C11_4, etc. to be recommended to the arbitrary object 620 may be arbitrarily selected. As illustrated in FIG. 11, the first color scheme scores of the 11_2-th color C11_2 and the 11_3-th color C11_3 may be 0.36.

A color combination score may be calculated as the sum of the first color scheme scores between one color included in the spatial image 510 and the arbitrary color C0 to be recommended. For example, the color combination score may be calculated by summing the first color scheme score between the arbitrary color C0 and the 11_1-th color C11_1, the color scheme score between the arbitrary color C0 and the 11_2-th color C11_2 of the plant 514, etc. Accordingly, the color combination score may be a numerical value of a degree of whether the arbitrary color C0 generally matches colors of the plurality of objects in the spatial image 510.

The electronic device 100 may determine a color having a high color combination score with respect to the spatial image 510 among the arbitrary colors C0 as the recommendation color RC, and provide the color recommendation information corresponding to the recommendation color RC.

Referring to FIG. 12, when the first object includes a plurality of faces including a first face and a second face, the electronic device 100, according to some embodiments of the disclosure, may obtain a second color scheme score between an arbitrary color included in the first face and a color included in the second face and provide color recommendation information with respect to the first face based on the second color scheme score.

The electronic device 100 may obtain the second color scheme score between an arbitrary color included in a first face 1221 and a color included in a second face 1222 included in the first object 1220 in the spatial image 1210 by applying the color characteristic information 521 to the first artificial intelligence model 200. The color characteristic information 521 may include information about a color included in the first object 1220 and information about various colors to be recommended to the first face 1221.

Accordingly, the electronic device 100 may obtain second color scheme scores between colors C12_1, C12_2, etc., of the plurality of faces included in the first object 1220 in the spatial image 1210 and colors C12_3, C12_4, etc., to be recommended to the first face 1221. The second color scheme scores may be numerical scores of degree of matching between the colors C12_1, C12_2, etc., of the plurality of faces included in the first object 1220 in the spatial image 1210 and the colors C11_3, C11_4, etc., to be recommended to the first face 1221.

For example, the second face 1222 of the first object 1220 in the spatial image 1210 may have the 12_1-th color C12_1, and the colors C12_3, C12_4, etc., to be recommended to the first face 1221 of the first object 1220 may be arbitrarily selected. The color of the second face 1222 of the first object 1220 may also be arbitrarily selected. The electronic device 100, according to some embodiments of the disclosure, may provide the color recommendation information of colors to be recommended to the first face 1221 and the second face 1222 of the first object 1220. As illustrated in FIG. 12, the second color scheme score of the 12_1-th color C12_1 and the 12_3-th color C12_3 may be 0.50. The second color scheme score may make the degree of matching between two colors correspond to a range of 0 to 1, but the range of the second color scheme score is only an example, and the disclosure is not limited thereto.

As another example, the second face 1222 of the first object 1220 in the spatial image 1210 may have the 12_2-th color C12_2, and the colors C12_3, C12_4, etc., to be recommended to the first face 1221 of the first object 1220 may be arbitrarily selected. As illustrated in FIG. 12, the second color scheme score of the 12_2-th color C12_2 and the 12_3-th color C12_3 may be 0.62.

The electronic device 100 may determine a color having a high second color scheme score with respect to the first object 1220 among arbitrary colors as the recommendation color RC, and provide color recommendation information corresponding to the recommendation color RC.

Figure 13:
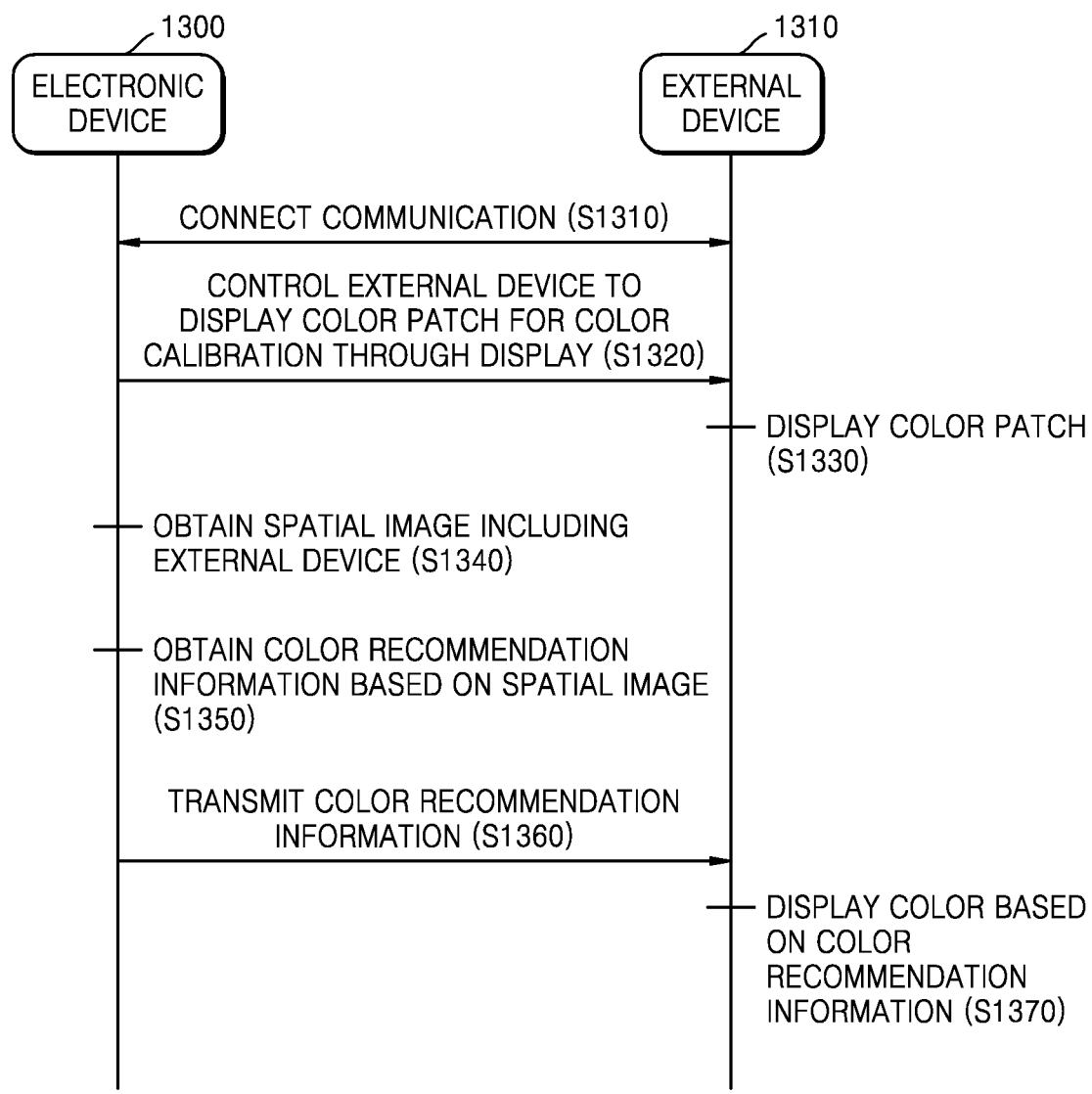
FIGS. 13 and 14 are flowcharts illustrating a method, performed by an electronic device, of controlling an external device to display a color based on color recommendation information, according to various embodiments of the disclosure.
Figure 14:
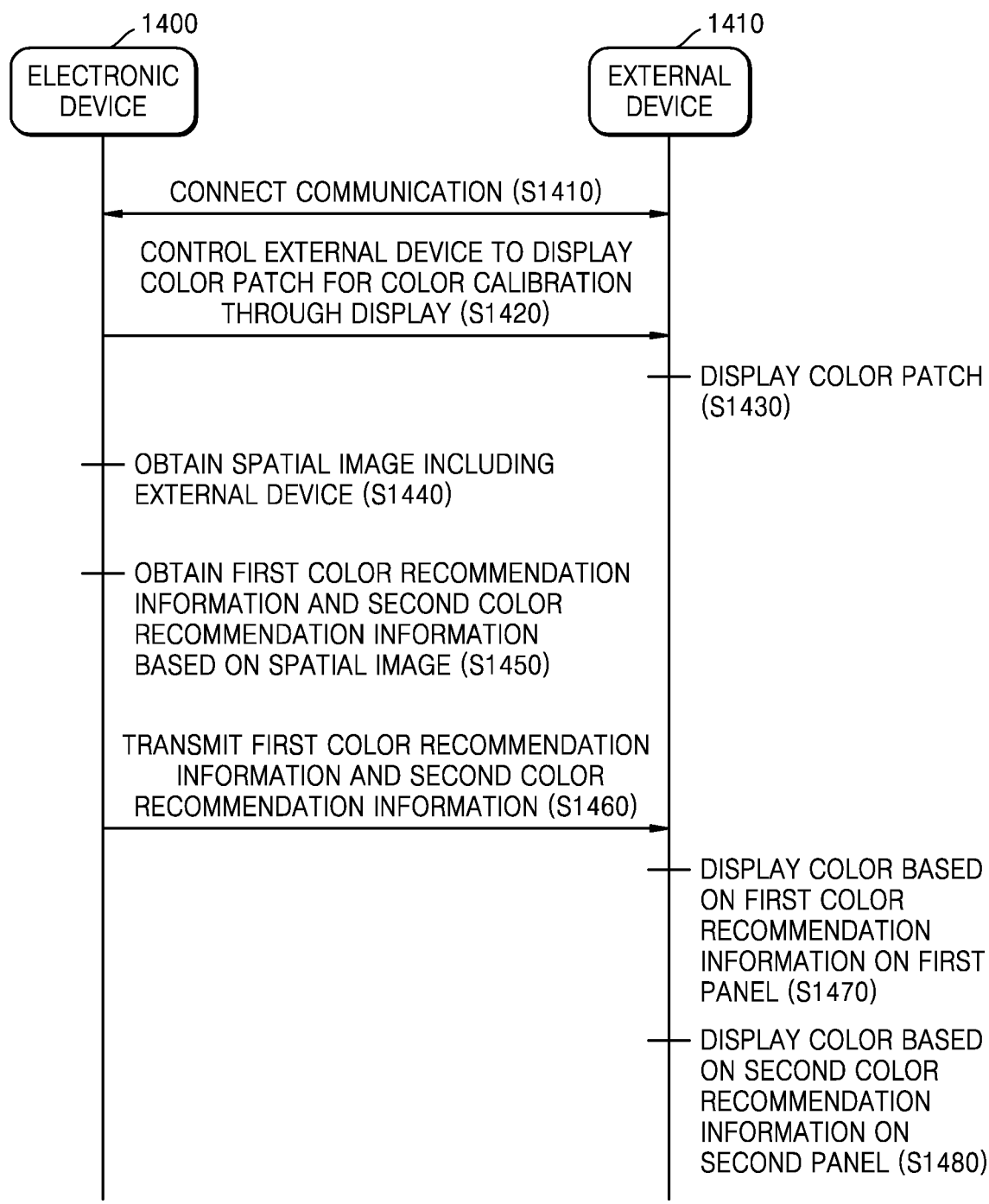

FIGS. 13 and 14 are flowcharts illustrating a method, performed by an electronic device, of controlling an external device to display a color based on color recommendation information according to some embodiments of the disclosure.

For convenience of descriptions, redundant descriptions with those given with reference to FIGS. 1 to 12 are briefly provided or omitted.

Referring to FIG. 13, an electronic device 1300, according to some embodiments of the disclosure, may be communicatively connected to an external device 1310 (S1310). The electronic device 1300 may transmit/receive signals to/from the external device 1310 through a communication interface. The external device 1310 may be a device including a display capable of displaying colors.

The electronic device 1300 may control the external device 1310 to display a color patch for color calibration through the display (S1320). The electronic device 1300 may perform color calibration based on a color patch (S1330) displayed through the display of the external device 1310. Color calibration may include, for example, calibration of color, brightness, chroma, white balance, etc.

The electronic device 1300 may obtain a spatial image including the external device 1310 (S1340). The spatial image may be the same as the spatial image described with reference to FIG. 1, and may include the external device 1310 and a plurality of objects.

The electronic device 1300 may obtain the spatial image by using at least one camera. The electronic device 1300 may receive the spatial image from another electronic device.

The electronic device 1300 may obtain the color recommendation information based on the spatial image (S1350). A method of obtaining the color recommendation information may be the same as that described with reference to FIGS. 1 to 12.

The electronic device 1300 may transmit the obtained color recommendation information to the external device 1310 through the communication interface (S1360). The electronic device 1300 may control the external device 1310 to display a color based on the color recommendation information through the display of the external device 1310 (S1370).

Referring to FIG. 14, an electronic device 1400, according to some embodiments of the disclosure, may be communicatively connected to an external device 1410 (S1410). The electronic device 1400 may transmit/receive signals to/from the external device 1410 through a communication interface. The external device 1410 may be a device including a display capable of displaying colors. The display included in the external device 1410 may include a first panel and a second panel capable of displaying colors.

The electronic device 1400 may control the external device 1410 to display a color patch for color calibration through the display (S1420). The electronic device 1400 may perform color calibration based on a color patch (S1430) displayed through the display of the external device 1410. Color calibration may include, for example, calibration of color, brightness, chroma, white balance, etc.

The electronic device 1400 may obtain the spatial image including the external device 1410 (S1440). The spatial image may be the same as the spatial image described with reference to FIG. 1, and may include the external device 1410 and a plurality of other objects.

The electronic device 1400 may obtain the spatial image by using at least one camera. The electronic device 1400 may receive the spatial image from another electronic device.

The electronic device 1400 may obtain the color recommendation information based on the spatial image. The electronic device 1400 may obtain first color recommendation information for recommending a color of the first panel and second color recommendation information for recommending a color of the second panel based on the spatial image (S1450). A method of obtaining the color recommendation information including the first color recommendation information and the second color recommendation information may be the same as that described with reference to FIGS. 1 to 12.

The electronic device 1400 may transmit the color recommendation information including the obtained first color recommendation information and second color recommendation information to the external device 1410 through the communication interface (S1460). The electronic device 1400 may control the external device 1410 to display colors based on the color recommendation information through the display of the external device 1410. Specifically, the electronic device 1400 may control the external device 1410 to display a color based on the first color recommendation information through the first panel of the external device 1410 (S1470), and may control the external device 1410 to display a color based on the second color recommendation information through the second panel of the external device 1410 (S1480).

Figure 15:
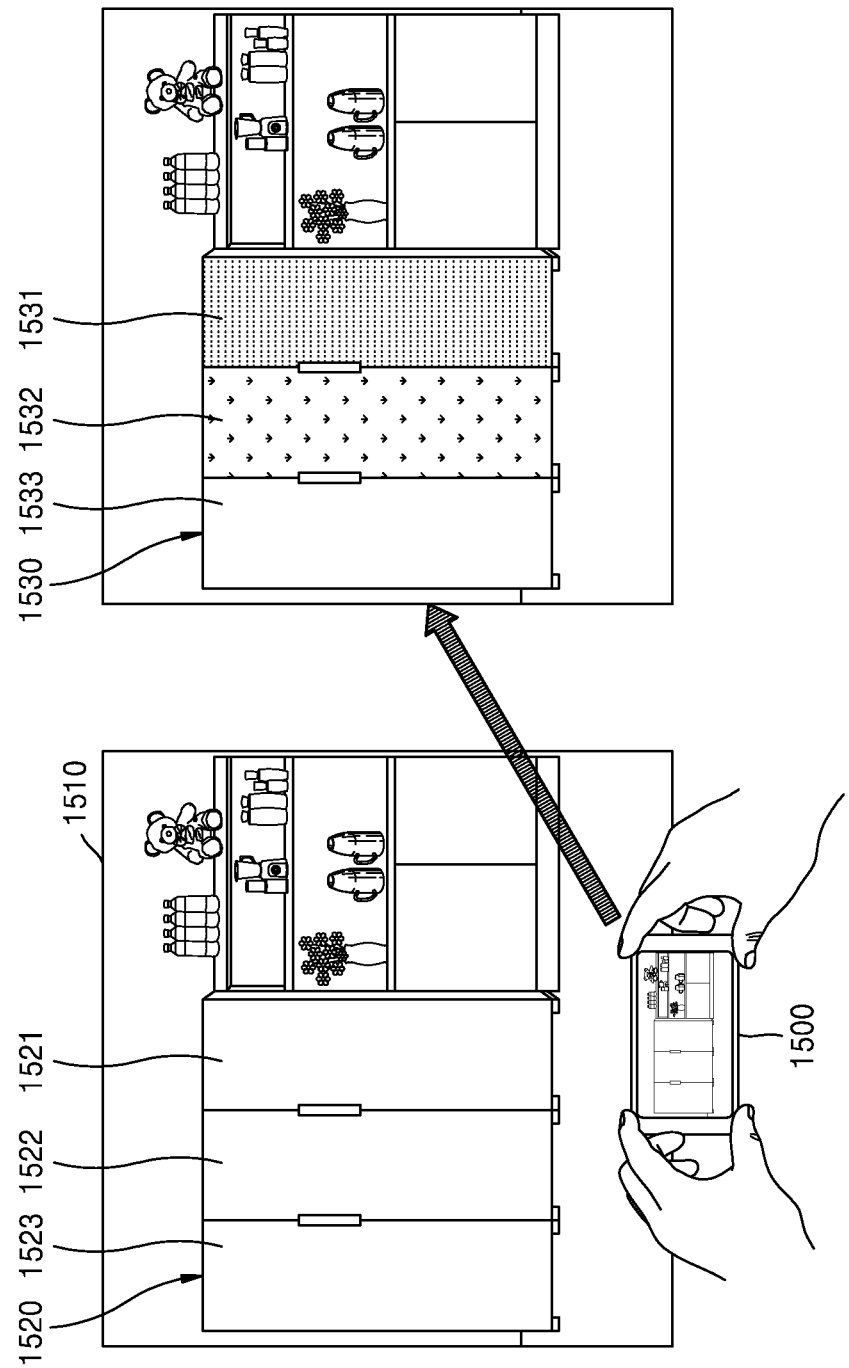
FIG. 15 is a diagram illustrating an operation, performed by an electronic device, of controlling an external device to display a color based on color recommendation information, according to various embodiments of the disclosure.

FIG. 15 is a diagram illustrating an operation, performed by an electronic device, of controlling an external device to display a color based on color recommendation information, according to some embodiments of the disclosure.

Referring to FIG. 15, an electronic device 1500, according to some embodiments of the disclosure may be communicatively connected to an external device 1520. The electronic device 1500 may transmit/receive signals to/from the external device 1520 through a communication interface. The external device 1520 may be a device including a display capable of displaying colors. The electronic device 1500 may transmit the color recommendation information to the external device 1520 so that a color based on the color recommendation information about an arbitrary object, for example, the external device 1520 is displayed on the display of the external device 1520.

The display may include a first panel 1521, a second panel 1522, and a third panel 1523, but this is only shown as an example, and the external device 1520 may be configured as a single display. For reference, FIG. 15 is described with respect to a display including three panels.

Here, the external device 1520 may be a refrigerator, but this is only an example, and the disclosure is not limited thereto. As another example, the external device 1520 may be a kimchi refrigerator, a cube refrigerator, a water purifier, a dishwasher, an induction, an oven, a microwave oven, a cooker, a windless air conditioner, a washing machine, a dryer, an air dresser, a shoe dresser, an air purifier, etc.

The electronic device 1500 may control the external device 1520 to display the color patch for color calibration on the display including the first panel 1521, the second panel 1522, and the third panel 1523. The electronic device 1500 may perform color calibration based on the color patch displayed on the display of the external device 1520.

The electronic device 1500 may obtain a spatial image 1510 including the external device 1520. The electronic device 1500 may obtain a spatial image using at least one camera. However, in other examples, the electronic device 1500 may receive a spatial image from another electronic device.

The electronic device 1500 may obtain the color recommendation information based on the spatial image. A method of obtaining the color recommendation information may be the same as that described with reference to FIGS. 1 to 12.

The color recommendation information may include, for example, first color recommendation information to third color recommendation information. When the display includes the first panel to the third panel, the electronic device 1500 may obtain the first color recommendation information with respect to the first panel, the second color recommendation with respect to the second panel, and the third color recommendation information with respect to the third panel based on scores of color combinations.

The electronic device 1500 may transmit the obtained first color recommendation information to third color recommendation information to the external device 1530 through the communication interface. The electronic device 1500 may transmit the first color recommendation information with respect to the first panel, the second color recommendation with respect to the second panel, and the third color recommendation information with respect to the third panel to the external device 1530 through the communication interface so that a first color based on the first color recommendation information is displayed on the first panel, a second color based on the second color recommendation information is displayed on the second panel, and the third color based on the third color recommendation information is displayed on the third panel.

The electronic device 1500 may control the external device 1530 to display a color based on the first color recommendation information on a first panel 1531 of the external device 1530. The electronic device 1500 may control the external device 1530 to display a color based on the second color recommendation information on a second panel 1532 of the external device 1530. The electronic device 1500 may control the external device 1530 to display a color based on the third color recommendation information on a third panel 1533 of the external device 1530.

Figure 16:
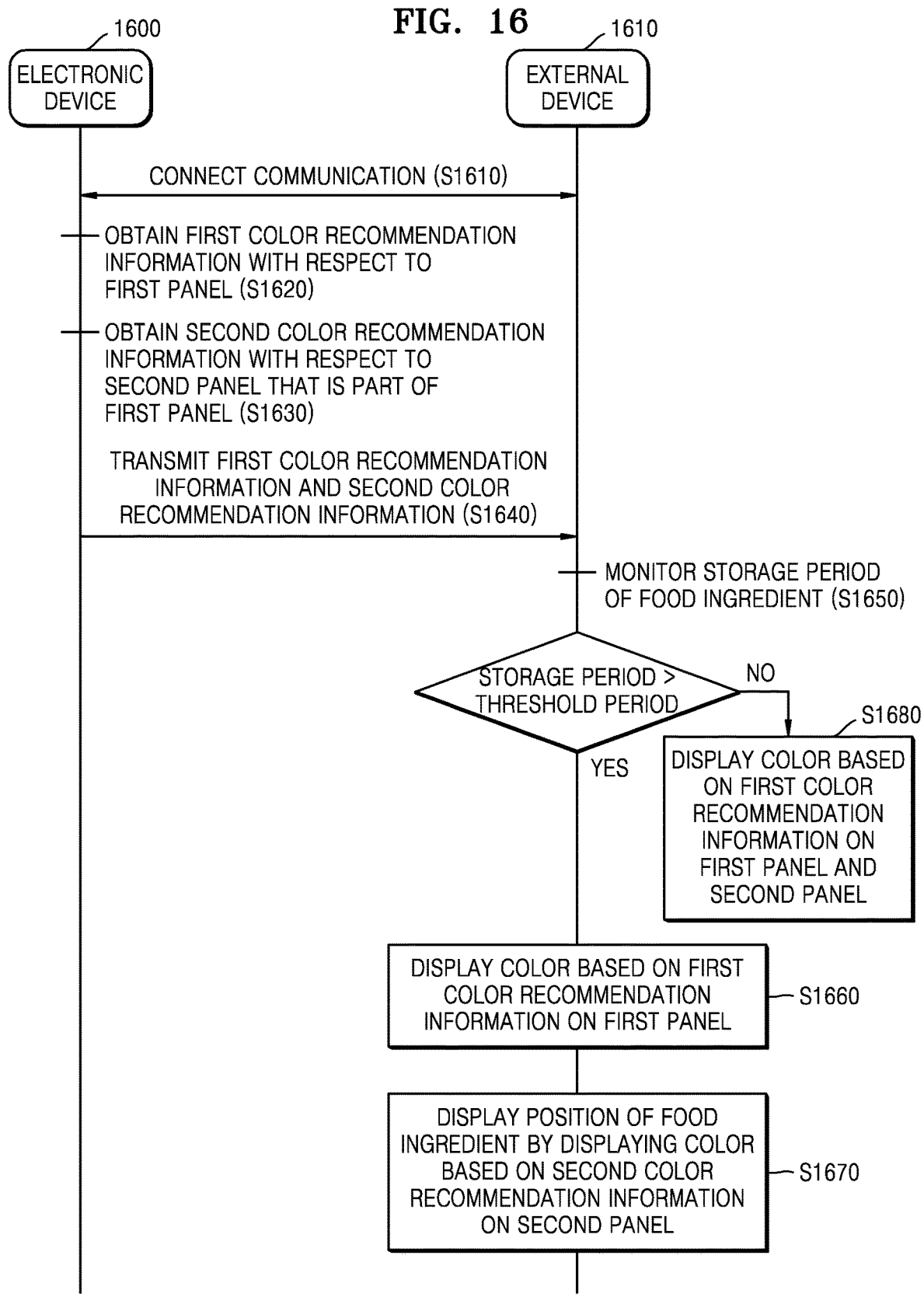
FIG. 16 is a flowchart illustrating a method of displaying a position of a spoiled food ingredient with a color based on color recommendation information, according to various embodiments of the disclosure.

FIG. 16 is a flowchart illustrating a method of displaying a position of a spoiled food ingredient with a color based on color recommendation information, according to some embodiments of the disclosure.

Referring to FIG. 16, an electronic device 1600, according to some embodiments of the disclosure may be communicatively connected to an external device 1610 (S1610). The electronic device 1600 may transmit/receive signals to and from the external device 1610 through a communication interface. The external device 1610 may be a device including a display capable of displaying colors. The display may include a plurality of panels including a first panel and a second panel, and the second panel may be a part of the first panel. The external device 1610 may be a refrigerator.

The electronic device 1600 may obtain a spatial image including the external device 1610. The electronic device 1600 may obtain the color recommendation information based on the spatial image. The electronic device 1600 may obtain first color recommendation information with respect to the first panel (S1620), and may obtain second color recommendation information with respect to a second panel that is a part of the first panel (S1630). A method of obtaining the color recommendation information may be the same as that described with reference to FIG. 14.

The electronic device 1600 may transmit the obtained first color recommendation information and second color recommendation information to the external device 1610 through the communication interface (S1640).

The external device 1610 may monitor a storage period of a stored food ingredient (S1650). The external device 1610 may, for example, use an object detection algorithm to identify a newly entered food ingredient and monitor a storage period of the newly entered food ingredient. A method, performed by the external device 1610, of identifying a food ingredient is merely an example, and the disclosure is not limited thereto.

When the storage period of the food ingredient is longer than a threshold period (e.g., "YES"), the electronic device 1600 may control the external device 1610 to display a color based on the first color recommendation information on the first panel (S1660). Furthermore, the electronic device 1600 may control the external device 1610 to display a position of a food ingredient having a long storage period in the external device 1610 by displaying a color based on the second color recommendation information on the second panel (S1670).

The electronic device 1600 may obtain the second color recommendation information based on a color combination score with the color displayed on the first panel according to the first color recommendation information. Accordingly, the electronic device 1600 may control the external device 1610 to display the color of the second panel that is a part of the first panel based on the second color recommendation information in consideration of a degree of color matching between the first panel and the second panel.

When the storage period of the food ingredient is shorter than the threshold period (e.g., "NO"), the electronic device 1600 may control the external device 1610 to display the color based on the first color recommendation information on the first panel and the second panel (S1680).

Figure 17:
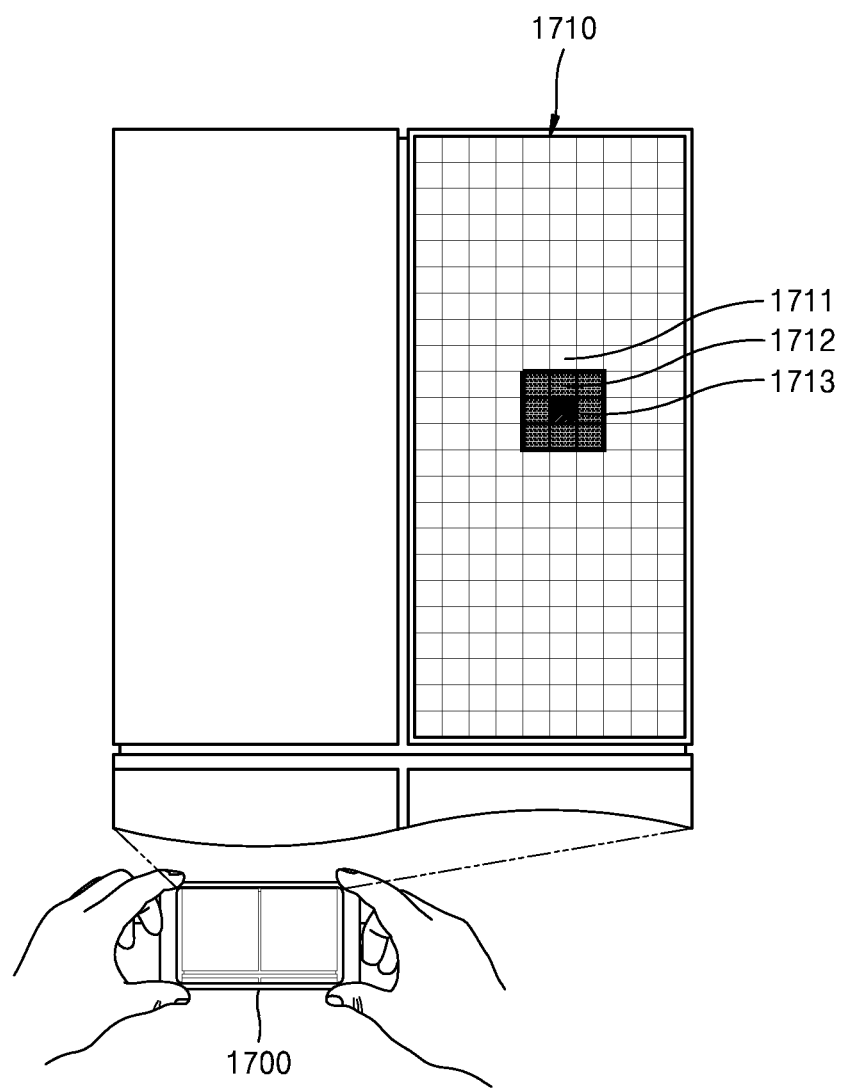
FIG. 17 is a diagram illustrating an operation of displaying a position of a spoiled food ingredient with a color based on color recommendation information, according to various embodiments of the disclosure.

FIG. 17 is a diagram illustrating an operation of displaying a position of a spoiled food ingredient with a color based on color recommendation information, according to some embodiments of the disclosure.

For convenience of descriptions, redundant descriptions with those given with reference to FIG. 16 are briefly provided.

Referring to FIG. 17, an electronic device 1700, according to some embodiments of the disclosure, may be communicatively connected to an external device 1710. The electronic device 1700 may transmit/receive signals to/from the external device 1710 through a communication interface. The external device 1710 may be a device including a display capable of displaying colors. The display may include a plurality of panels including first to third panels 1711, 1712, and 1713. The second panel 1712 may be a part of the first panel 1711, and the third panel 1713 may be a part of the second panel 1712. The external device 1710 may be a refrigerator.

The electronic device 1700 may obtain a spatial image including the external device 1710. The electronic device 1700 may obtain the color recommendation information based on the spatial image. The electronic device 1700 may obtain first color recommendation information with respect to the first panel 1711, obtain second color recommendation information with respect to the second panel 1712 that is a part of the first panel 1711, and obtain third color recommendation information with respect to the third panel 1713 that is a part of the second panel 1712.

The electronic device 1700 may obtain the first color recommendation information with respect to the first panel 1711 based on scores of color combinations. Furthermore, the electronic device 1700 may obtain the second color recommendation information with respect to the second panel 1712 based on the scores of the color combinations and a color corresponding to the first color recommendation information with respect to the first panel 1711. Furthermore, the electronic device 1700 may obtain the third color recommendation information with respect to the third panel 1713 based on the scores of the color combinations, the color corresponding to the first color recommendation information with respect to the first panel 1711, and a color corresponding to the second color recommendation information with respect to the second panel 1712.

The electronic device 1700 may transmit the obtained first color recommendation information to third color recommendation information to the external device 1710 through the communication interface.

When a storage period of a food ingredient is longer than a threshold period, the electronic device 1700 may control the eternal device 1710 to display the colors based on the first color recommendation information to the third color recommendation information on the first panel to the third panel 1711, 1712, and 1713, respectively. The electronic device 1700 may control the external device 1710 to display a position of the food ingredient having a long storage period in the external device 1710 by displaying the color based on the third color recommendation information on the third panel 1713.

When the external device 1710 is a refrigerator, the third panel 1713 may be a panel corresponding to a position of a food ingredient having a storage period exceeds the threshold period. Accordingly, the electronic device 1700, according to some embodiments of the disclosure, may control a color of a panel around the third panel 1713 of the external device 1710 in order to display the position of the food ingredient having the storage period that exceeds the threshold period.

When the storage period of the food ingredient is shorter than the threshold period, the electronic device 1700 may control the external device 1710 to display the color based on the first color recommendation information on the first panel to the third panel 1711, 1712, and 1713.

In FIG. 17, the external device 1710 including the display including the first to third panels 1711, 1712, and 1713 has been described, but the number of panels capable of displaying different colors is only an example, and does not limit the disclosure. For example, as described with reference to FIG. 16, the electronic device 1700 may control the external device 1710 capable of displaying the position of old food through the first panel and the second panel.

Figure 18:
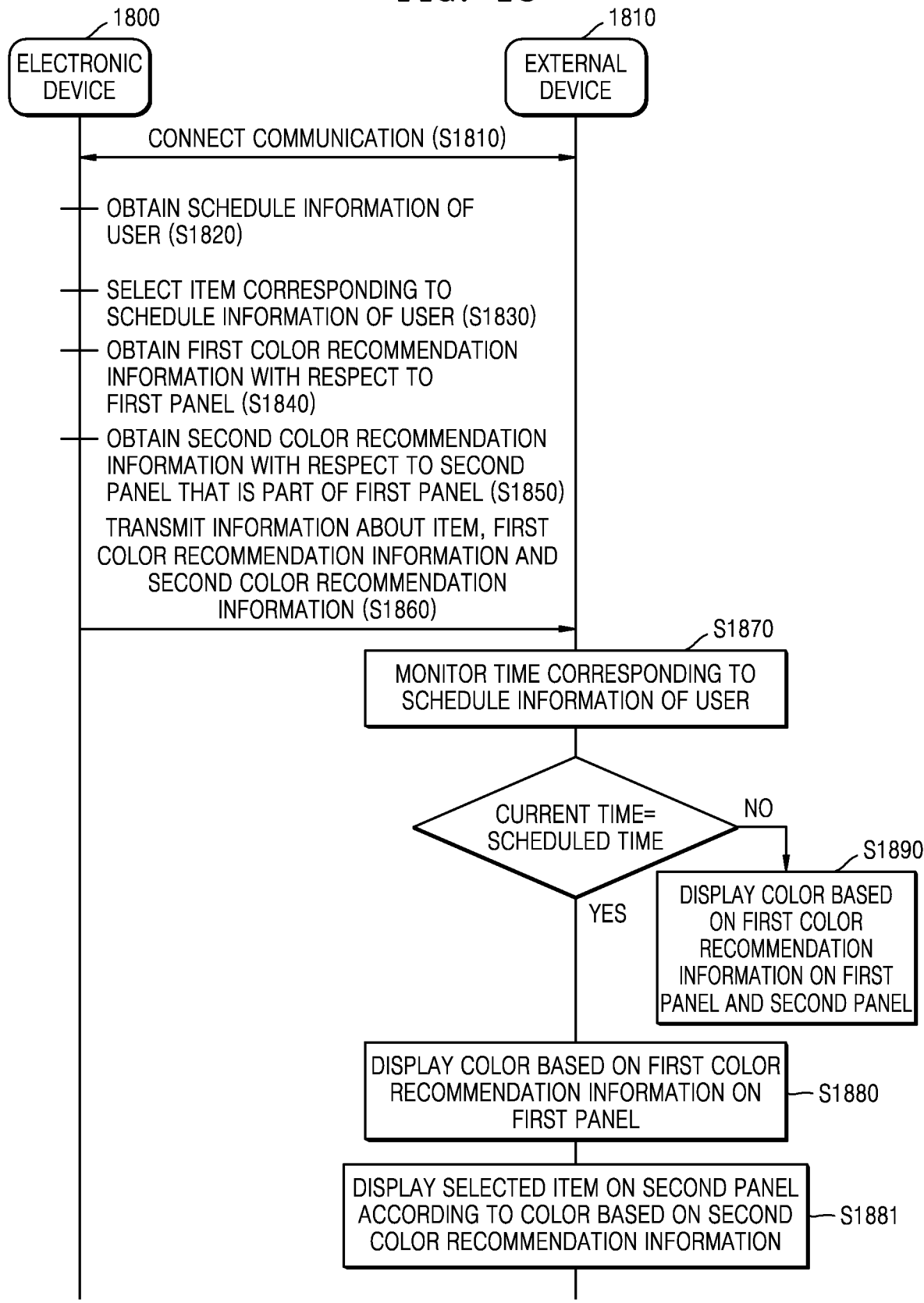
FIG. 18 is a flowchart illustrating a method of displaying an item corresponding to schedule information of a user with a color based on color recommendation information, according to various embodiments of the disclosure.

FIG. 18 is a flowchart illustrating a method of displaying an item corresponding to schedule information of a user with a color based on color recommendation information, according to some embodiments of the disclosure.

Referring to FIG. 18, an electronic device 1800, according to some embodiments of the disclosure, may be communicatively connected to an external device 1810 (S1810). The electronic device 1800 may transmit/receive signals to/from the external device 1810 through a communication interface. The external device 1810 may be a device including a display capable of displaying colors. The display may include a plurality of panels including a first panel and a second panel, and the second panel may be a part of the first panel.

The electronic device 1800 may obtain the schedule information of the user (S1820). The electronic device 1800 may obtain the schedule information of the user according to a user input, or may receive the schedule information of the user through another electronic device. A method of obtaining the schedule information of the user does not limit the disclosure.

The schedule information of the user may include information about contents of a user's schedule. For example, the user's schedule may correspond to a holiday such as Christmas. Furthermore, when a call is received from another user, the user's schedule may be a phone call. Furthermore, the electronic device 1800 may obtain the user's schedule for Jul. 12, 2022 according to the user input.

The electronic device 1800 may select an item corresponding to the schedule information of the user from among a plurality of items (S1830). The item may be an image corresponding to the schedule information of the user and capable of intuitively expressing the schedule information of the user. For example, when the user's schedule is Christmas, the item corresponding to the schedule information of the user may be a Christmas tree image. Furthermore, when the user's schedule is a phone call, the item corresponding to the schedule information of the user may be a handset image.

The electronic device 1800 may store the plurality of items in a memory. Alternatively, after obtaining the schedule information of the user, the electronic device 1800 may selectively receive the item corresponding to the schedule information of the user from among the plurality of items through an external server, but this is only an example, and a method of storing or receiving the plurality of items does not limit the disclosure.

The electronic device 1800 may obtain a spatial image including the external device 1810. The electronic device 1800 may obtain color recommendation information based on the spatial image. The electronic device 1800 may obtain first color recommendation information with respect to the first panel (S1840), and may obtain second color recommendation information with respect to the second panel that is a part of the first panel (S1850). A method of obtaining the color recommendation information may be the same as that described with reference to FIG. 14.

The electronic device 1800 may transmit the obtained first color recommendation information and second color recommendation information to the external device 1810 through the communication interface (S1860). The electronic device 1800 may transmit information of the item and the second color recommendation information to the external device 1810 through the communication interface so that the item is displayed on the second panel in a color based on the second color recommendation information.

The electronic device 1800 may monitor a time corresponding to the schedule information of the user (S1870). Alternatively, the electronic device 1800 may control the external device 1810 to monitor the time corresponding to the schedule information of the user.

When the current time coincides with the time corresponding to the schedule information of the user (e.g., "YES"), the electronic device 1800 may control the external device 1810 to display the color based on the first color recommendation information on the first panel (S1880). Furthermore, the electronic device 1800 may control the external device 1810 to alarm the user's schedule through the external device 1810, by displaying the selected item on the second panel according to the color based on the second color recommendation information (S1881).

The electronic device 1800 may obtain the second color recommendation information based on a color combination score with the color displayed on the first panel according to the first color recommendation information. Accordingly, the electronic device 1800 may control the external device 1810 to display the color of the second panel that is a part of the first panel based on the second color recommendation information in consideration of a degree of color matching between the first panel and the second panel.

When the current time does not coincide with the time corresponding to the schedule information of the user (e.g., "NO"), the electronic device 1800 may control the external device 1810 to display the color based on the first color recommendation information on the first panel and the second panel (S1890).

Figure 19:
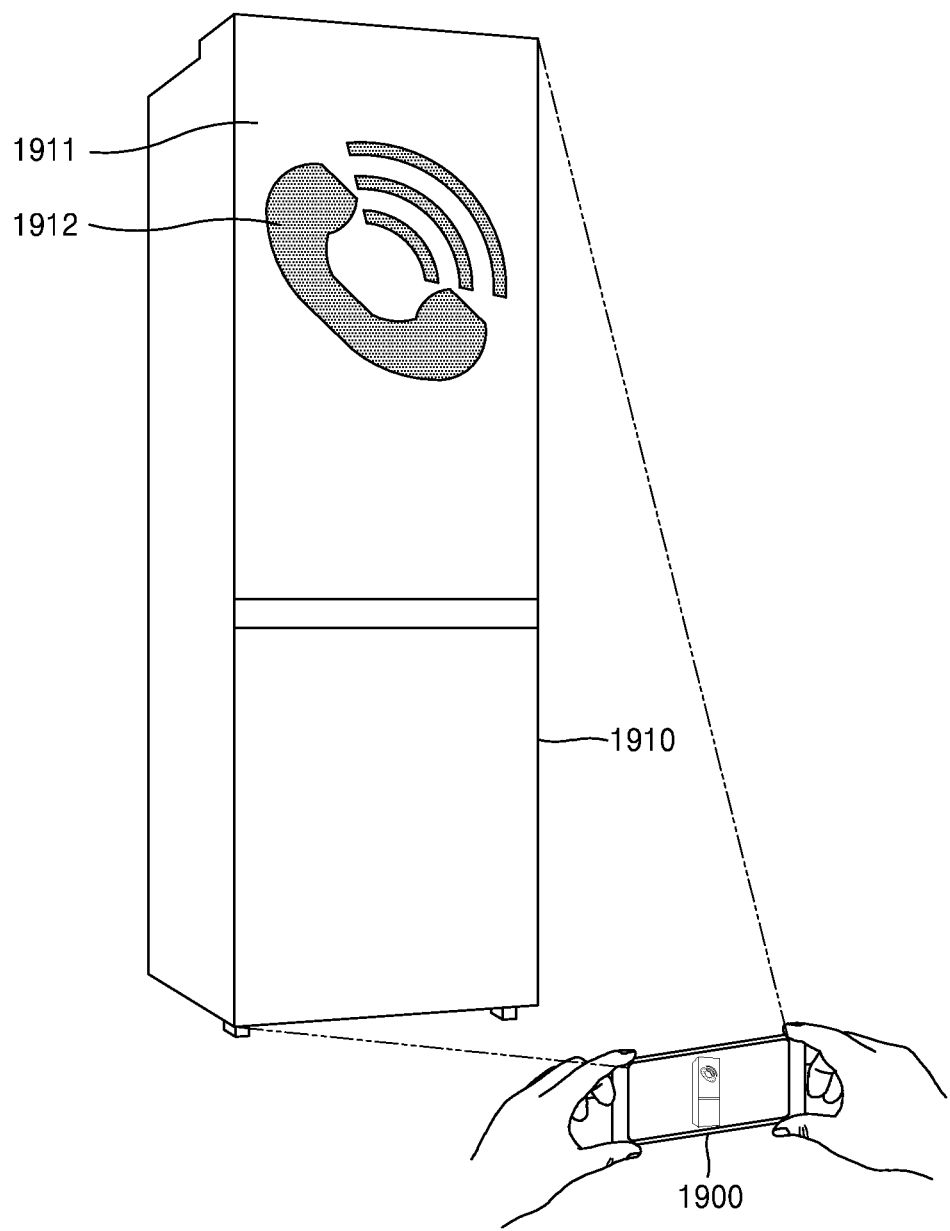
FIGS. 19 to 21 are diagrams illustrating an operation of displaying an item corresponding to schedule information of a user with a color based on color recommendation information, according to various embodiments of the disclosure.
Figure 20:
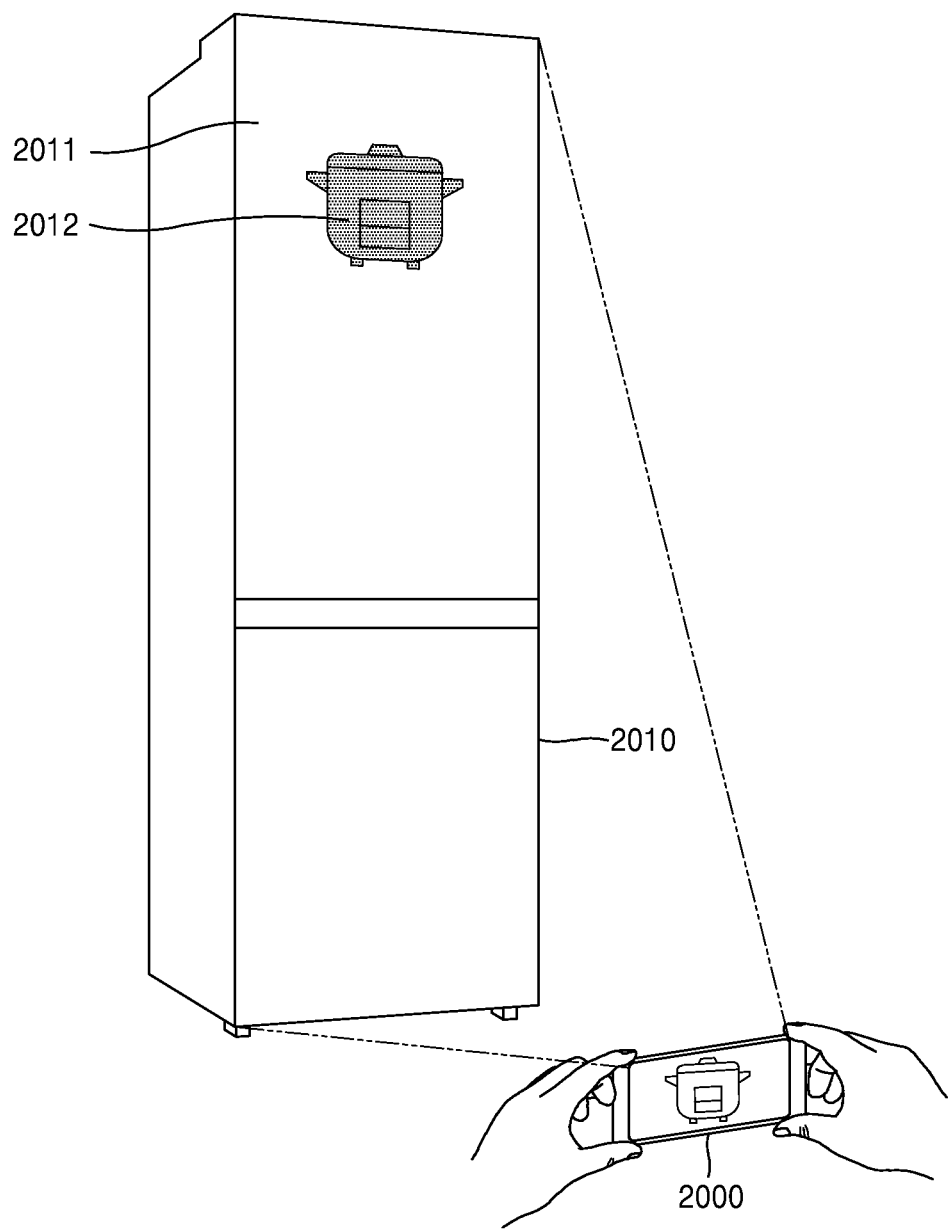
Figure 21:
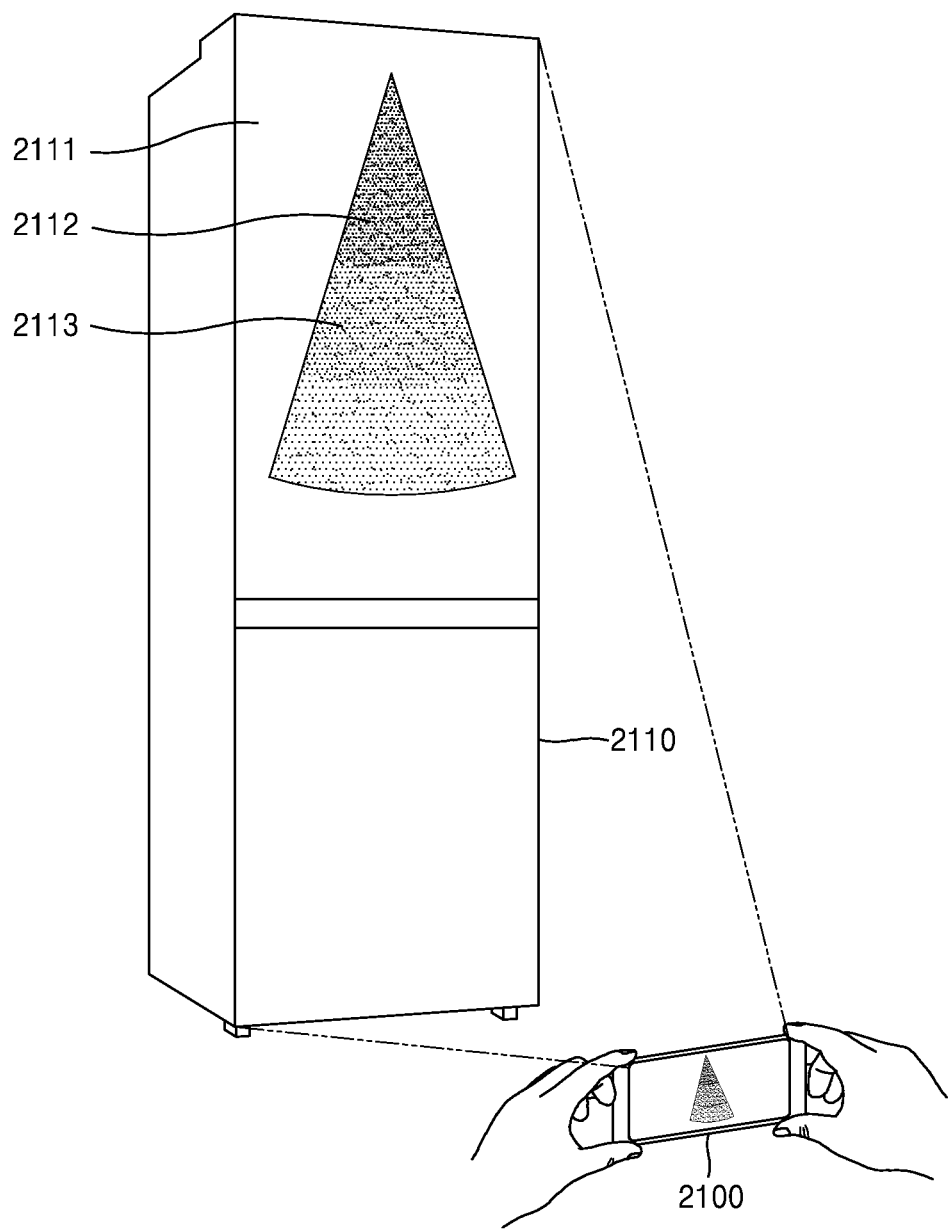

FIGS. 19 to 21 are diagrams illustrating an operation of displaying an item corresponding to schedule information of a user with a color based on color recommendation information according to some embodiments of the disclosure.

For reference, FIGS. 19 to 21 illustrate an operation of alarming a user's schedule through the external device described with reference to FIG. 18. For convenience of descriptions, redundant descriptions with those given with reference to FIG. 18 are briefly provided or omitted.

Referring to FIG. 19, an electronic device 1900, according to some embodiments of the disclosure, may be communicatively connected to an external device 1910. The electronic device 1900 may transmit/receive signals to/from the external device 1910 through a communication interface. The external device 1910 may be a device including a display capable of displaying colors. The display may include a plurality of panels including a first panel 1911 and a second panel 1912. The second panel 1912 may be a part of the first panel 1911.

The electronic device 1900 may obtain the schedule information of the user. The electronic device 1900 may obtain the schedule information of the user according to a user input, or may receive the schedule information of the user through another electronic device. A method of obtaining the schedule information of the user does not limit the disclosure.

The electronic device 1900 may select the item corresponding to the schedule information of the user from among a plurality of items. The item may be an image corresponding to the schedule information of the user and capable of intuitively expressing the schedule information of the user. As shown in FIG. 19, when the user's schedule is a phone call, the item corresponding to the schedule information of the user may be a handset image.

The electronic device 1900 may obtain a spatial image including the external device 1910. The electronic device 1900 may obtain color recommendation information based on the spatial image. The electronic device 1900 may obtain first color recommendation information with respect to a first panel 1911, and may obtain second color recommendation information with respect to a second panel 1912 that is a part of the first panel 1911. A method of obtaining the color recommendation information may be the same as that described with reference to FIG. 14.

The electronic device 1900 may transmit the obtained first color recommendation information and second color recommendation information to the external device 1910 through the communication interface.

The electronic device 1900 may monitor a time corresponding to the schedule information of the user. Alternatively, the electronic device 1900 may control the external device 1910 to monitor the time corresponding to the schedule information of the user.

When the current time coincides with the time corresponding to the schedule information of the user (e.g., a time when the call is received), the electronic device 1900 may control the external device 1910 to display a color based on the first color recommendation information on the first panel 1911. Furthermore, the electronic device 1900 may control the external device 1910 to alarm the user's schedule through the external device 1910, by displaying the selected item (e.g., the handset image, on the second panel 1912 according to a color based on the second color recommendation information).

The electronic device 1900 may obtain the second color recommendation information based on a color combination score with the color displayed on the first panel 1911 according to the first color recommendation information. Accordingly, the electronic device 1900 may control the external device 1910 to display the color of the second panel 1912 that is a part of the first panel 1911, based on the second color recommendation information in consideration of a degree of color matching between the first panel 1911 and the second panel 1912.

Accordingly, the electronic device 1900 may control the external device 1910 to display the color of the handset image on the second panel 1912 in consideration of the degree of matching with the color displayed on the first panel 1911.

For convenience of descriptions, redundant descriptions with those given with reference to FIG. 19 are briefly provided or omitted.

Referring to FIG. 20, an electronic device 2000, according to some embodiments of the disclosure, may be communicatively connected to an external device 2010. The electronic device 2000 may obtain schedule information of the user.

The electronic device 2000 may select an item corresponding to the schedule information of the user from among a plurality of items. The item may be an image corresponding to the schedule information of the user and capable of intuitively expressing the schedule information of the user. As shown in FIG. 20, when the user's schedule includes cooking rice, the schedule information of the user may include information about completion of the cooking of the rice. The item corresponding to the schedule information of the user about the completion of the cooking of rice may be a rice cooker image.

The electronic device 2000 may obtain a spatial image including the external device 2010. The electronic device 2000 may obtain color recommendation information based on the spatial image. The electronic device 2000 may obtain first color recommendation information with respect to a first panel 2011 and may obtain second color recommendation information with respect to a second panel 2012 that is a part of the first panel 2011. A method of obtaining the color recommendation information may be the same as that described with reference to FIG. 14.

The electronic device 2000 may transmit the obtained first color recommendation information and second color recommendation information to the external device 2010 through the communication interface.

The electronic device 2000 may monitor a time corresponding to the schedule information of the user. Alternatively, the electronic device 2000 may control the external device 2010 to monitor the time corresponding to the schedule information of the user.

When the current time coincides with the time corresponding to the schedule information of the user (e.g., a time when cooking of rice is completed), the electronic device 2000 may control the external device 2010 to display a color based on the first color recommendation information on the first panel 2011. Furthermore, the electronic device 2000 may control the external device 2010 to alarm the user's schedule through the external device 2010, by displaying the selected item (e.g., the rice cooker image), on the second panel 2012 according to a color based on the second color recommendation information.

The electronic device 2000 may obtain the second color recommendation information based on a color combination score with the color displayed on the first panel 2011 according to the first color recommendation information. Accordingly, the electronic device 2000 may control the external device 2010 to display the color of the second panel 2012 that is a part of the first panel 2011, based on the second color recommendation information in consideration of a degree of color matching between the first panel 2011 and the second panel 2012.

Accordingly, the electronic device 2000 may control the external device 2010 to display a color of the rice cooker image on the second panel 2012 in consideration of the degree of matching with the color displayed on the first panel 2011.

Referring to FIG. 21, an electronic device 2100, according to some embodiments of the disclosure, may be communicatively connected to an external device 2110. The electronic device 2100 may transmit/receive signals with the external device 2110 through a communication interface. The external device 2110 may be a device including a display capable of displaying colors. The display may include a plurality of panels including first to third panels 2111, 2112, and 2113. The second panel 2112 may be a part of the first panel 2111, and the third panel 2113 may be a part of the first panel 2111.

The electronic device 2100 may obtain schedule information of the user.

The electronic device 2100 may select an item corresponding to the schedule information of the user from among a plurality of items. The item may be an image corresponding to the schedule information of the user and capable of intuitively expressing the schedule information of the user. As shown in FIG. 21, when the user's schedule corresponds to the Christmas holiday, the item corresponding to the schedule information of the user may be a Christmas tree image.

The electronic device 2100 may obtain a spatial image including the external device 2110. The electronic device 2100 may obtain color recommendation information based on the spatial image. The electronic device 2100 may obtain first color recommendation information with respect to the first panel 2111, obtain second color recommendation information with respect to the second panel 2112 that is a part of the first panel 2111, and obtain third color recommendation information with respect to the third panel 2113 that is a part of the first panel 2111. A method of obtaining the color recommendation information may be the same as that described with reference to FIG. 14.

The electronic device 2100 may transmit the obtained first color recommendation information to the third color recommendation information to the external device 2110 through the communication interface.

The electronic device 2100 may monitor a time corresponding to the schedule information of the user.

When the current time coincides with a time corresponding to the schedule information of the user, the electronic device 2100 may control the external device 2110 to display a color based on the first color recommendation information on the first panel 2111. Furthermore, the electronic device 2100 may control the external device 2110 to alarm the user's schedule through the external device 2110, by displaying the selected item (e.g., the Christmas tree image), on the second panel 2112 and the third panel 2113 according to the color based on the second color recommendation information and the color based on the third color recommendation information.

The electronic device 2100 may obtain the second color recommendation information based on a color combination score with the color displayed on the first panel 2111 according to the first color recommendation information. Accordingly, the electronic device 2100 may control the external device 2110 to display the color of the second panel 2112 that is a part of the first panel 2111, based on the second color recommendation information in consideration of a degree of color matching between the first panel 2111 and the second panel 2112.

Furthermore, the electronic device 2100 may obtain the third color recommendation information based on color combination scores with the color displayed on the first panel 2111 according to the first color recommendation information and the color displayed on the second panel 2112 according to the second color recommendation information. Accordingly, the electronic device 2100 may control the external device 2110 to display the color of the second panel 2113 that is a part of the first panel 2111, based on the third color recommendation information in consideration of the degree of color matching between the first panel to the third panel 2111, 2112, and 2113.

Accordingly, the electronic device 2100 may control the external device 2110 to display a color of the Christmas tree image on the second panel 2112 and the third panel 2113 in consideration of the degree of matching with the color displayed on the first panel 2111.

Figure 22:
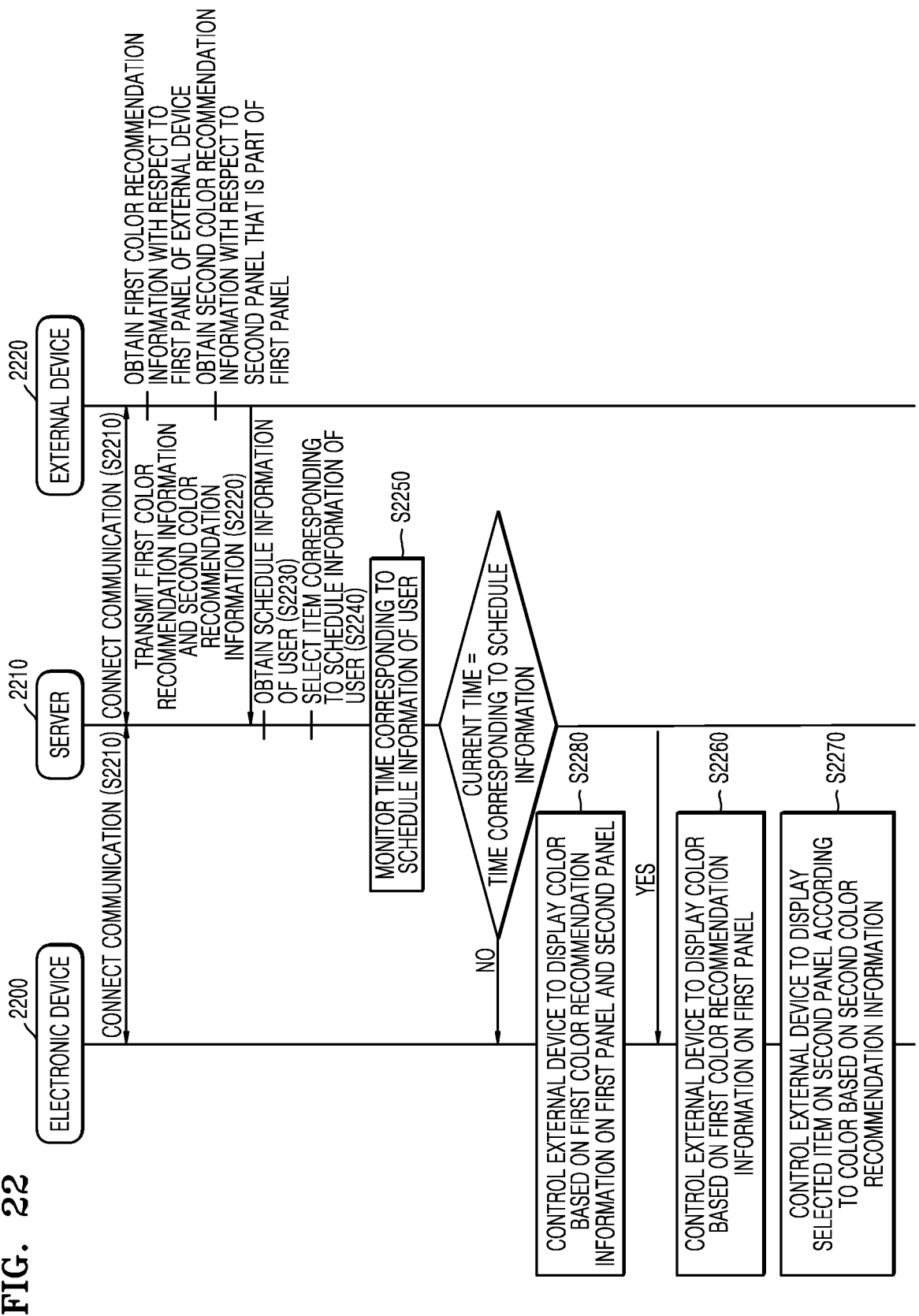
FIG. 22 is a diagram illustrating an operation, performed by an electronic device, of displaying an item corresponding to schedule information of a user with a color based on color recommendation information by using a server, according to various embodiments of the disclosure.

FIG. 22 is a diagram illustrating an operation, performed by an electronic device, of displaying an item corresponding to schedule information of a user with a color based on color recommendation information by using a server according to some embodiments of the disclosure.

Referring to FIG. 22, an electronic device 2200, according to some embodiments of the disclosure, may be communicatively connected to a server 2210 and an external device 2220 (S2210). The electronic device 2200 may transmit/receive signals to/from the server 2210 and the external device 2220 through a communication interface. The external device 2220 may be a device including a display capable of displaying colors. The display may include a plurality of panels including a first panel and a second panel, and the second panel may be a part of the first panel.

The electronic device 2200 may obtain a spatial image including the external device 2220. The electronic device 2200 may obtain color recommendation information based on the spatial image. The electronic device 2200 may obtain first color recommendation information with respect to the first panel, and may obtain second color recommendation information with respect to the second panel that is a part of the first panel. A method of obtaining the color recommendation information may be the same as that described with reference to FIG. 14.

The electronic device 2200 may transmit the obtained first color recommendation information and second color recommendation information to the server 2210 through the communication interface (S2220).

The electronic device 2200 may obtain schedule information of a user through the server 2210 (S2230). The electronic device 2200 may obtain the schedule information of the user received by the server 2210 from another electronic device. The schedule information of the user may include information about contents of a user's schedule. For example, the user's schedule may correspond to a holiday such as Christmas. Furthermore, when a call is received from another user, the user's schedule may be a phone call. Furthermore, the electronic device 2200 may obtain the user's schedule for Jul. 12, 2022 according to a user input.

The electronic device 2200 may select an item corresponding to the schedule information of the user from among a plurality of items through the server 2210 (S2240). The item may be an image corresponding to the schedule information of the user and capable of intuitively expressing the schedule information of the user. For example, when the user's schedule is Christmas, the item corresponding to the schedule information of the user may be a Christmas tree image. Furthermore, when the user's schedule is the phone call, the item corresponding to the schedule information of the user may be a handset image.

The electronic device 2200 may monitor a time corresponding to the schedule information of the user through the server 2210 (S2250).

When the current time coincides with the time corresponding to the schedule information of the user (e.g., "YES"), the electronic device 2200 may control the external device 2220 through the server 2210 to display a color based on the first color recommendation information on the first panel (S2260). Furthermore, the electronic device 2200 may control the external device 2220 through the server 2210 to alarm the user's schedule through the external device 2220, by displaying the selected item on the second panel according to the color based on the second color recommendation information (S2270).

When the current time does not coincide with the time corresponding to the schedule information of the user (e.g., "NO"), the electronic device 2200 may control the external device 2220 through the server 2210 to display the color based on the first color recommendation information on the first panel and the second panel (S2280).

Figure 23:
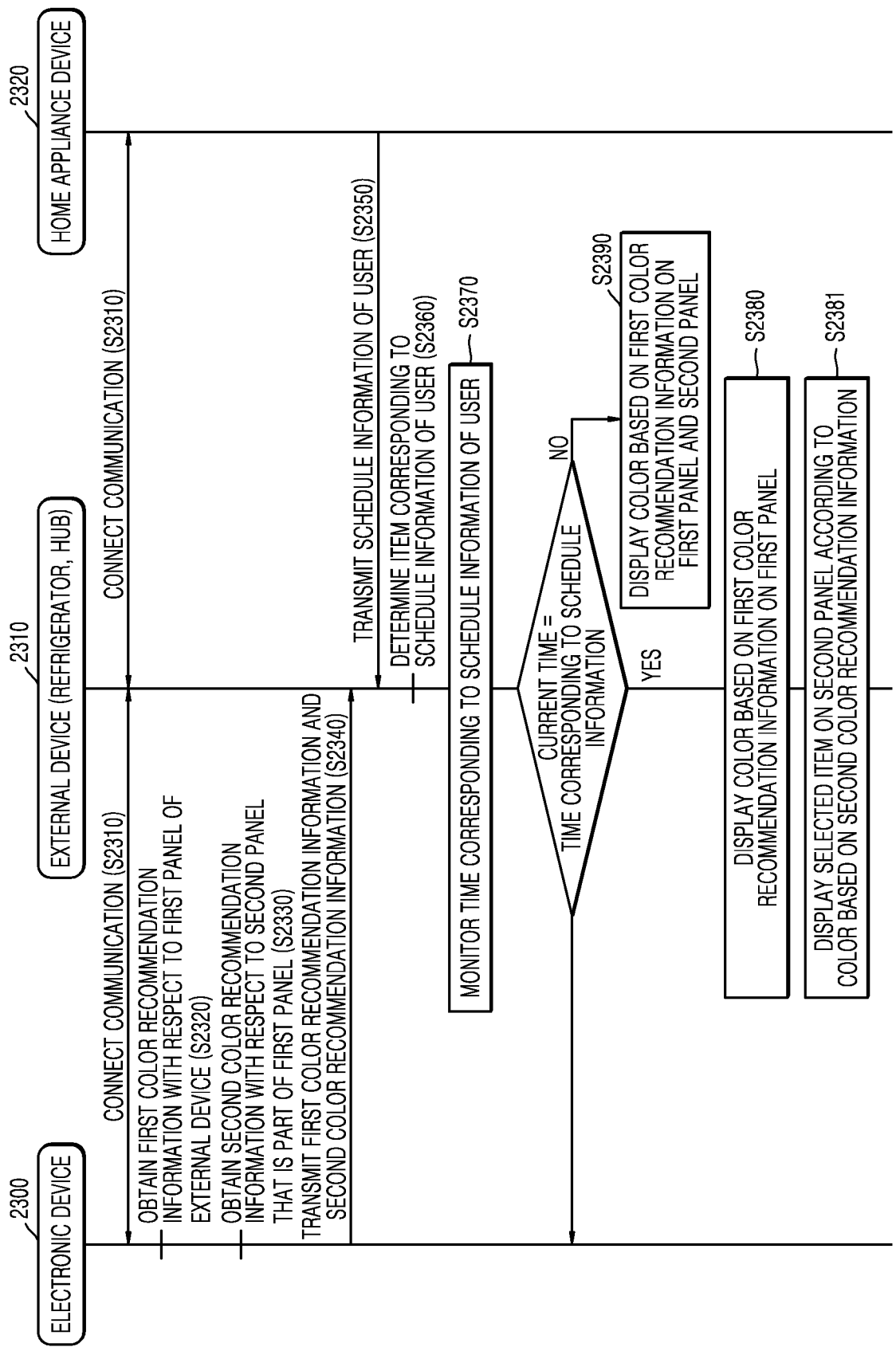
FIGS. 23 and 24 are flowcharts illustrating a method, performed by an electronic device, of displaying an item corresponding to schedule information of a user with a color based on color recommendation information by using a multi-device hub, according to various embodiments of the disclosure.
Figure 24:
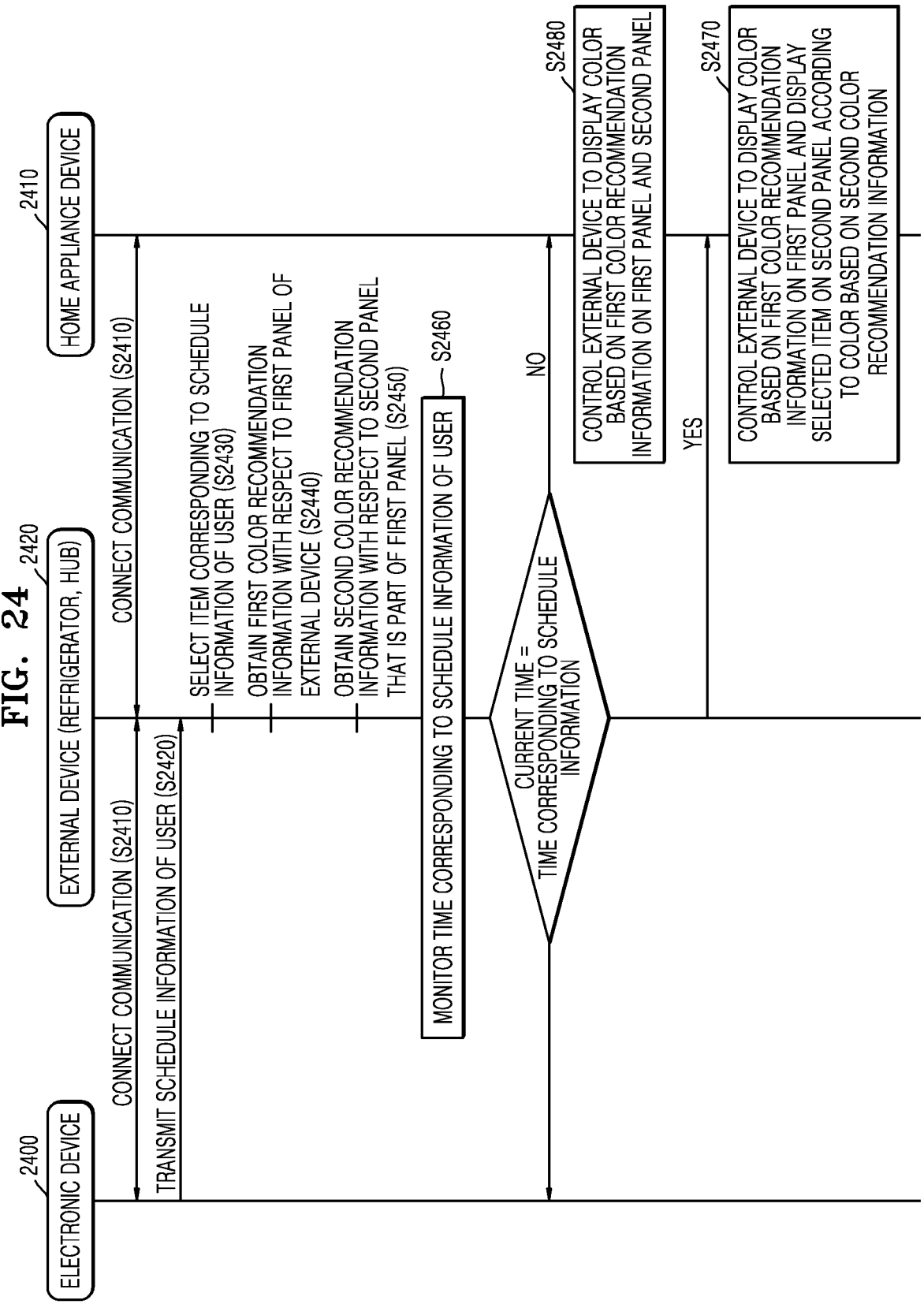

FIGS. 23 and 24 are flowcharts illustrating a method, performed by an electronic device, of displaying an item corresponding to schedule information of a user with a color based on color recommendation information by using a multi-device hub, according to some embodiments of the disclosure.

Referring to FIG. 23, an electronic device 2300, according to some embodiments of the disclosure, may be communicatively connected to an external device 2310 and a home appliance device 2320 (S2310). The electronic device 2300 may transmit/receive signals to/from the external device 2310 and the home appliance device 2320 through a communication interface. The electronic device 2300 may be communicatively connected with the plurality of home appliance devices 2320 through the external device 2310 that is communicatively connected with the plurality of home appliance devices 2320.

The external device 2310 may be a device including a display capable of displaying colors. The display may include a plurality of panels including a first panel and a second panel, and the second panel may be a part of the first panel. The external device 2310 may be, for example, a refrigerator including the display.

The home appliance device 2320 may be a home appliance related to a user's schedule. For example, the home appliance device 2320 may be a mobile phone related to a call reception of the user, a rice cooker notifying the completion of cooking of rice of the user, and an electronic device including a calendar function including information about the user's schedule.

The electronic device 2300 may obtain a spatial image including the external device 2310. The electronic device 2300 may obtain the color recommendation information based on the spatial image. The electronic device 2300 may obtain first color recommendation information with respect to the first panel (S2320), and may obtain second color recommendation information with respect to the second panel that is a part of the first panel (S2330). A method of obtaining the color recommendation information may be the same as that described with reference to FIG. 14.

The electronic device 2300 may transmit the obtained first color recommendation information and second color recommendation information to the external device 2310 through the communication interface (S2340).

The external device 2310 may obtain the schedule information of the user from the plurality of home appliance devices 2320 (S2350). The schedule information of the user may include information about contents of the user's schedule. For example, the user's schedule may correspond to a holiday such as Christmas. Furthermore, when a call is received from another user, the user's schedule may be a phone call. Furthermore, the external device 2310 may obtain the user's schedule for Jul. 12, 2022 according to a user input. The external device 2310 may be a hub collecting the schedule information of the user from the plurality of home appliance devices 2320.

The external device 2310 may select an item corresponding to the schedule information of the user from among a plurality of items (S2360). The item may be an image corresponding to the schedule information of the user and capable of intuitively expressing the schedule information of the user. For example, when the user's schedule is Christmas, the item corresponding to the schedule information of the user may be a Christmas tree image. Furthermore, when the user's schedule is the phone call, the item corresponding to the schedule information of the user may be a handset image.

The electronic device 2300 may control to monitor a time corresponding to the schedule information of the user through the external device 2310 (S2370).

When the current time coincides with the time corresponding to the schedule information of the user (e.g., "YES"), the electronic device 2300 may control the external device 2310 to display a color based on the first color recommendation information on the first panel (S2380). Furthermore, the electronic device 2300 may control the external device 2310 to alarm the user's schedule through the external device 2310, by displaying the selected item on the second panel according to the color based on the second color recommendation information (S2381).

When the current time does not coincide with the time corresponding to the schedule information of the user (e.g., "NO"), the electronic device 2300 may control the external device 2310 to display the color based on the first color recommendation information on the first panel and the second panel (S2390).

Referring to FIG. 24, an electronic device 2400, according to some embodiments of the disclosure, may be communicatively connected to a home appliance device 2410 and an external device 2420 (S2410). The electronic device 2400 may transmit/receive signals with the home appliance device 2410 and the external device 2420 through a communication interface. The electronic device 2400 may be a hub communicatively connected with the plurality of home appliance devices 2410 and receiving signals, and may control the external device 2420.

The home appliance device 2410 may be a home appliance related to the user's schedule. For example, the home appliance device 2410 may be a mobile phone related to a call reception of the user, a rice cooker notifying the completion of cooking of rice of the user, and an electronic device including a calendar function including information about the user's schedule.

The external device 2420 may be a device including a display capable of displaying colors. The display may include a plurality of panels including a first panel and a second panel, and the second panel may be a part of the first panel. The external device 2420 may be, for example, a refrigerator including the display.

The electronic device 2400 may obtain the schedule information of the user from the plurality of home appliance devices 2410 (S2420). The schedule information of the user may include information about contents of the user's schedule. For example, the user's schedule may correspond to a holiday such as Christmas. Furthermore, when a call is received from another user, the user's schedule may be a phone call. The electronic device 2400 may be a hub collecting the schedule information of the user from the plurality of home appliance devices 2410.

The electronic device 2400 may select an item corresponding to the schedule information of the user from among a plurality of items (S2430). The item may be an image corresponding to the schedule information of the user and capable of intuitively expressing the schedule information of the user. For example, when the user's schedule is Christmas, the item corresponding to the schedule information of the user may be a Christmas tree image. Furthermore, when the user's schedule is the phone call, the item corresponding to the schedule information of the user may be a handset image.

The electronic device 2400 may select the item corresponding to the schedule information of the user from among the plurality of items. The item may be an image corresponding to the schedule information of the user and capable of intuitively expressing the schedule information of the user. For example, when the user's schedule is Christmas, the item corresponding to the schedule information of the user may be the Christmas tree image. Furthermore, when the user's schedule is the phone call, the item corresponding to the schedule information of the user may be the handset image.

The electronic device 2400 may obtain a spatial image including the external device 2420. The electronic device 2400 may obtain color recommendation information based on the spatial image. The electronic device 2400 may obtain first color recommendation information with respect to the first panel of the external device 2420 (S2440), and may obtain second color recommendation information with respect to the second panel that is a part of the first panel (S2450). A method of obtaining the color recommendation information may be the same as that described with reference to FIG. 14.

The electronic device 2400 may monitor a time corresponding to the schedule information of the user (S2460).

When the current time coincides with the time corresponding to the schedule information of the user (e.g., "YES"), the electronic device 2400 may control the external device 2420 to display a color based on the first color recommendation information on the first panel. Furthermore, the electronic device 2400 may control the external device 2420 to alarm the user's schedule through the external device 2420, by displaying the selected item on the second panel according to the color based on the second color recommendation information (S2470).

When the current time does not coincide with the time corresponding to the schedule information of the user (e.g., "NO"), the electronic device 2400 may control the external device 2420 to display the color based on the first color recommendation information on the first panel and the second panel (S2480).

Figure 25:
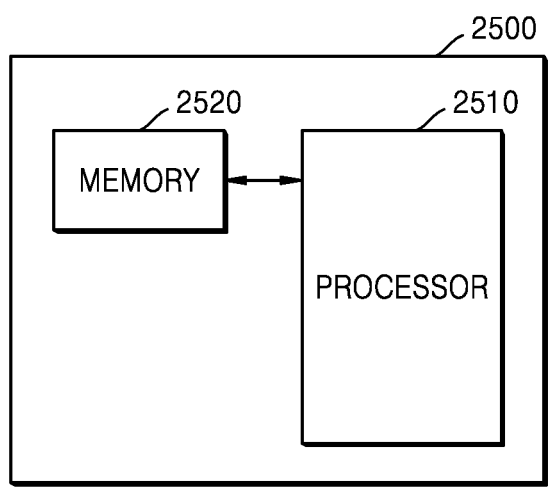
FIG. 25 is a schematic block diagram of an electronic device according to various embodiments of the disclosure.
Figure 26:
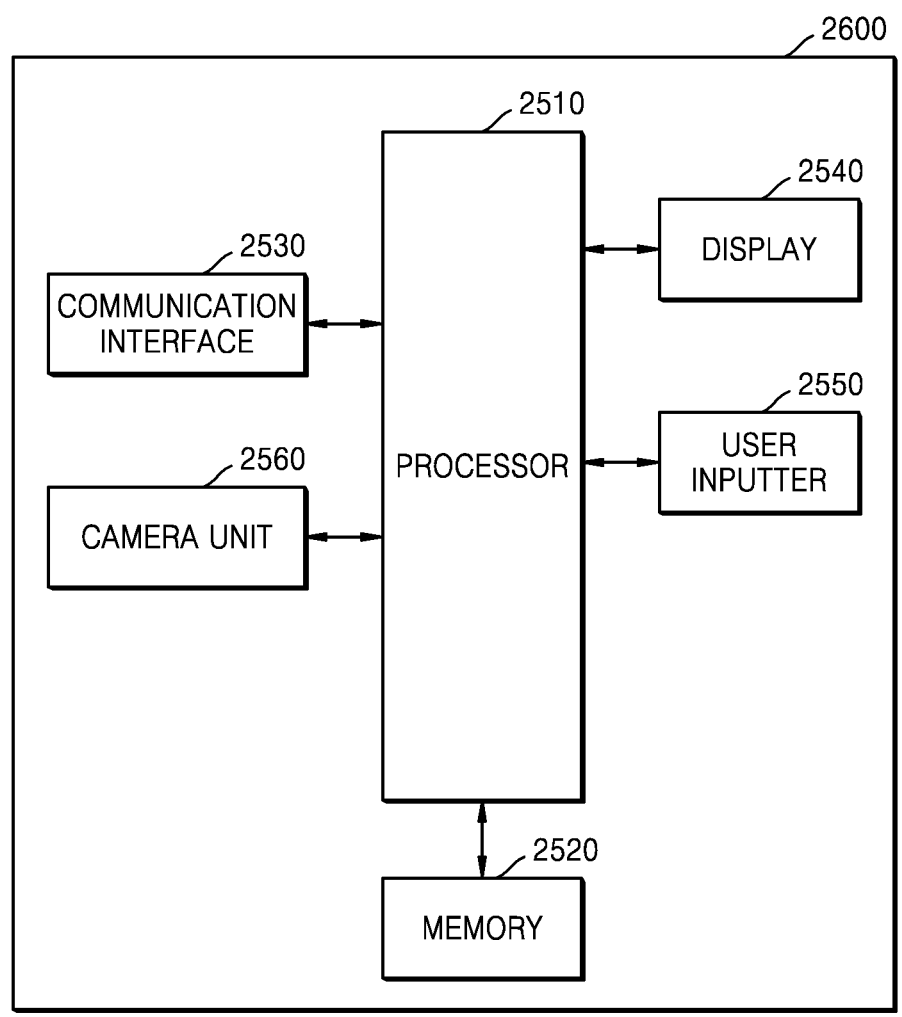
FIG. 26 is a block diagram illustrating in detail a configuration of an electronic device according to various embodiments of the disclosure.

FIG. 25 is a schematic block diagram of an electronic device, according to some embodiments of the disclosure. FIG. 26 is a block diagram illustrating in detail a configuration of the electronic device, according to some embodiments of the disclosure.

Referring to FIG. 25, an electronic device 2500 may include a processor 2510 and a memory 2520. However, the disclosure is not limited thereto. For example, the electronic device 2500 may further include components or may not include some components so as to perform a function of the electronic device 2500. For example, the electronic device 2500 may further include a communication interface 2530 establishing communication with an external device.

The processor 2510 (or a controller) may include one or a plurality of processors. The processor 220 may be implemented in hardware, firmware, or a combination of hardware and software. The processor 220 may be central processing unit (CPU), a graphics processing unit (GPU), and accelerated processing unit (APU), a microprocessor, a microcontroller, a digital signal processor (DSP), a field-programmable gate array (FPGA), and application-specific integrated circuit (ASIC), or any other type of processing component known to one of ordinary skill in the art. Furthermore, the processor 2510 may include a non-volatile memory including a ROM in which a control program for controlling the electronic device 2500 is stored and a volatile memory including a RAM storing signals or data input from the outside of the electronic device 2500 or used as a storage area for various operations performed by the electronic device 2500. The RAM may be used as the storage area for control information received from the outside, operation information of the electronic device 2500, or state information of the electronic device 2500.

The processor 2510 controls the overall operation of the electronic device 2500 and a signal flow between internal components of the electronic device 2500, and performs a function of processing data. The processor 2510 controls power supplied to internal components by using a power supplier. For example, the processor 2510 may control the memory 2520 to execute a program stored in the memory 2520, and retrieve or store necessary information.

According to some embodiments of the disclosure, the processor 2510 may obtain a spatial image including a plurality of objects, obtain color characteristic information about colors included in the plurality of objects in the spatial image and relation characteristic information defining relations between the plurality of objects in the spatial image, obtain a score of a color combination between each of the colors included in the plurality of objects in the spatial image and an arbitrary color by applying the color characteristic information and the relation characteristic information to a first artificial intelligence model, and provide color recommendation information with respect to a space including the plurality of objects based on the score of the color combination.

In some embodiments of the disclosure, the processor 2510 may further obtain object characteristic information including information about types or positions of the plurality of objects, and obtain the score of the color combination by further applying the object characteristic information to the first artificial intelligence model.

In some embodiments of the disclosure, the processor 2510 may obtain information about a first interior style corresponding to the spatial image from among a plurality of interior styles, and select the first artificial intelligence model corresponding to the first interior style from among a plurality of artificial intelligence models.

In some embodiments of the disclosure, the first artificial intelligence model may be trained to estimate a first color scheme score of a color combination between a color included in at least a first object among the plurality of objects and an arbitrary color, based on the training scores of the color combinations, and the processor 2510 may provide color recommendation information with respect to a first object selected by a user from among the plurality of objects in the spatial image, based on the first color scheme score.

In some embodiments of the disclosure, when the first object includes a plurality of faces including a first face and a second face, the first artificial intelligence model may be trained to estimate a second color scheme score of a color combination between a color included in the first face and the arbitrary color, based on the training scores of the color combinations, and the processor 2510 may provide color recommendation information with respect to the second face selected by the user based on the second color scheme score.

In some embodiments of the disclosure, when the first object is an external device including a display, the processor 2510 may transmit the color recommendation information to the first object through the communication interface so that a color based on the color recommendation information with respect to the first object is displayed on the display of the first object.

In some embodiments of the disclosure, when the display includes the first panel and the second panel, the processor 2510 may obtain first color recommendation information with respect to the first panel and second color recommendation information with respect to the second panel based on the score of the color combination, and transmit the first color recommendation information with respect to the first panel and the second color recommendation information with respect to the second panel to the first object through the communication interface so that a first color based on the first color recommendation information is displayed on the first panel, and a second color based on the second color recommendation information is displayed on the second panel.

In some embodiments of the disclosure, when the second panel is a part of the first panel, the processor 2510 may provide the first color recommendation information with respect to the first panel based on the first color scheme score, and provide the second color recommendation information with respect to the second panel based on the first color scheme score and the second color scheme score.

In some embodiments of the disclosure, the processor 2510 may select an item corresponding to schedule information of the user, and transmit information about the item and color recommendation information with respect to the first object to the first object through the communication interface so that the item is displayed on the display in a color based on the color recommendation information with respect to the first object.

According to some embodiments of the disclosure, the memory 2520 may include a storage medium of at least one type selected from flash memory type, hard disk type, multimedia card micro type, card type memory (e.g., SD or XD memory, etc.), random access memory (RAM), static RAM (SRAM), read-only memory (ROM), electrically erasable programmable ROM (EEPROM), PROM, magnetic memory, magnetic disk, and optical disk.

According to some embodiments of the disclosure, the memory 2520 may store one or more instructions set for the processor 2510 to obtain a spatial image including a plurality of objects, obtain color characteristic information about colors included in the plurality of objects in the spatial image and relation characteristic information defining relations between the plurality of objects in the spatial image, obtain a score of a color combination between each of the colors included in the plurality of objects in the spatial image and an arbitrary color by applying the color characteristic information and the relation characteristic information to a first artificial intelligence model, and provide color recommendation information with respect to a space including the plurality of objects based on the score of the color combination.

In some embodiments of the disclosure, the memory 2520 may store at least one instructions set for the processor 2510 to further obtain object characteristic information including information about types or positions of the plurality of objects, and obtain the score of the color combination by further applying the object characteristic information to the first artificial intelligence model In some embodiments of the disclosure, the memory 2520 may store at least one instructions set for the processor 2510 to obtain information about a first interior style corresponding to the spatial image from among a plurality of interior styles, and select the first artificial intelligence model corresponding to the first interior style from among a plurality of artificial intelligence models In some embodiments of the disclosure, the memory 2520 may store at least one instructions set for the processor 2510 to provide color recommendation information with respect to a first object selected by a user from among the plurality of objects in the spatial image, based on the first color scheme score.

In some embodiments of the disclosure, the memory 2520 may store at least one instructions set for the processor 2510 to provide color recommendation information with respect to a first face selected by the user based on the second color scheme score when the first object in the spatial image includes a plurality of faces including the first face.

In some embodiments of the disclosure, the memory 2520 may store at least one instructions set for the processor 2510 to transmit the color recommendation information to the first object through a communication interface so that a color based on the color recommendation information with respect to the first object is displayed on a display of the first object when the first object is an external device including the display.

In some embodiments of the disclosure, the memory 2520 may store at least one instructions set for the processor 2510 to obtain first color recommendation information with respect to a first panel and second color recommendation information with respect to a second panel based on the score of the color combination, and transmit the first color recommendation information with respect to the first panel and the second color recommendation information with respect to the second panel to the first object through the communication interface so that a first color based on the first color recommendation information is displayed on the first panel, and a second color based on the second color recommendation information is displayed on the second panel when the display includes a first panel and a second panel.

In some embodiments of the disclosure, the memory 2520 may store at least one instructions set for the processor 2510 to provide the first color recommendation information with respect to the first panel based on the first color scheme score, and provide the second color recommendation information with respect to the second panel based on the first color scheme score and the second color scheme score when the second panel is a part of the first panel.

In some embodiments of the disclosure, the memory 2520 may store at least one instructions set for the processor 2510 to select an item corresponding to schedule information of the user, and transmit information about the item and color recommendation information with respect to the first object to the first object through the communication interface so that the item is displayed on the display in a color based on the color recommendation information with respect to the first object.

The electronic device 2500 may further include a communication interface. The electronic device 2500 may be functionally connected to an external device by using the communication interface. The external device may include, for example, at least one of a user terminal, a platform server, an artificial intelligence server, or a home appliance device.

The electronic device 2500 may transmit operation information corresponding to an operation (e.g., displaying a color based on color recommendation information on a display of an external device, etc.) of the electronic device 2500 through the communication interface, or receive the schedule information of the user from the home appliance device.

Referring to FIG. 26, an electronic device 2600 may further include a communication interface 2530, a display 2540, a user inputter 2550, and a camera unit 2560.

The communication interface 2530 may be connected to an external device through a mobile communication network, a wireless LAN communication network, or a short-range communication network by using one or more antennas under the control by the processor 2510. Wireless LAN communication may be wirelessly connected to an access point (AP) at a place where the AP is installed under the control by the processor 2510. For example, wireless LAN communication may include Wi-Fi communication. Short-range communication may include Bluetooth communication, Bluetooth low energy communication, infrared data association (IrDA) communication, ultra-wideband (UWB) communication, magnetic secure transmission (MST) communication, and/or NFC communication, etc. In various embodiments of the disclosure, the term 'communication interface' may be connected to an external device through mobile communication, wireless LAN communication, and/or short-range communication.

The display 2540 may provide (or display) a graphical user interface (GUI) corresponding to various services (e.g., voice call, video call, data transmission, broadcast reception, photographing, video content viewing, or electronic payment including mobile payment). In some embodiments of the disclosure, the display 2540 may also mean a touch screen.

The display 2540 may display a color based on color recommendation information under the control by the processor 2510. When the display 2540 includes a plurality of panels including a first panel and a second panel, the display 2540 may display a color based on first color recommendation information on the first panel, and display a color based on second color recommendation information on the second pane, under the control by the processor 2510.

The user inputter 2550 refers to means for a user to input data for controlling the electronic device 2600. For example, the user inputter 2550 may include a key pad, a dome switch, a touch pad (contact capacitive method, pressure resistance film method, infrared sensing method, surface ultrasonic conduction method, integral tension measurement method, piezo effect method, etc.), a jog wheel, a jog switch, etc., but is not limited thereto.

The camera unit 2560 may capture a still image or a moving picture under the control by the processor 2510.

The camera unit 2560 may capture a still image or a moving picture under the control by the processor 2510. The camera unit 2560 may capture a still image or a moving picture of a space including a plurality of objects in order to provide the color recommendation information.

According to some embodiments of the disclosure, the camera unit 2560 may be at least one of a telephoto camera, a wide-angle camera, or a general camera, but is not limited thereto.

It may be easily understood by those of ordinary skill in the art that at least one component of the components of the electronic devices 2500 and 2600 described above may be added, deleted, or changed in response to the performance of the electronic devices 2500 and 2600.

A device-readable storage medium may include a form of a non-transitory storage medium. Here, the "non-transitory storage medium" only denotes a tangible device and does not contain a signal (for example, electromagnetic waves). This term does not distinguish a case where data is stored in the storage medium semi-permanently and a case where the data is stored in the storage medium temporarily. For example, the "non-transitory storage medium" may include a buffer where data is temporarily stored.

According to some embodiments of the disclosure, a method according to various embodiments disclosed in the present specification may be provided by being included in a computer program product. The computer program product may be transacted between a seller and a purchaser. The computer program product may be distributed in a form of machine-readable storage medium (for example, a CD-ROM), or distributed (for example, downloaded or uploaded) through an application store or directly or online between two user devices (for example, smart phones). In the case of online distribution, at least a part of the computer program product (for example, a downloadable application) may be at least temporarily generated or temporarily stored in a machine-readable storage medium, such as a server of a manufacturer, a server of an application store, or a memory of a relay server.

The invention claimed is:

1. An electronic device comprising:
a memory storing one or more instructions; and
a processor configured to execute the one or more instructions stored in the memory to:
obtain a spatial image comprising a plurality of pixels corresponding to a plurality of objects,
perform a pixel analysis on the plurality of pixels to extract one or more colors from the spatial image,
obtain, based on the extracted one or more colors, color characteristic information about colors included in the plurality of objects in the spatial image and relation characteristic information defining relations between the plurality of objects in the spatial image,
obtain, by applying the color characteristic information and the relation characteristic information to a first artificial intelligence model, a first color scheme score of a color combination, wherein the first artificial intelligence model is trained to estimate the first color scheme score of a color combination between a color included in at least an object from the plurality of objects in the spatial image and an arbitrary color, wherein the first artificial intelligence model is trained using (i) a co-occurrence count or color with respect to a plurality of training objects in a plurality of training images and (ii) training scores of color combinations between colors included in the plurality of training objects plurality of training images, and
provide color recommendation information with respect to a first object selected by a user from the plurality of objects, based on the first color scheme score of the color combination.

2. The electronic device of claim 1, wherein
the processor is further configured to execute the one or more instructions stored in the memory to:
obtain object characteristic information comprising information about a type or position of each object in the plurality of objects, and
obtain the first color scheme score of the color combination by further applying the object characteristic information to the first artificial intelligence model.

3. The electronic device of claim 1, wherein the relation characteristic information includes at least one of (i) information about position adjacency between at least two objects from the plurality of objects, or (ii) information about category relevance between the two objects.

4. The electronic device of claim 1, wherein
the processor is further configured to execute the one or more instructions stored in the memory to:
obtain information about a first interior style corresponding to the spatial image from a plurality of interior styles, and
select the first artificial intelligence model corresponding to the first interior style from a plurality of artificial intelligence models.

5. The electronic device of claim 1, wherein
the first artificial intelligence model is configured to:
obtain the plurality of training images,
obtain, based on the plurality of training images, the co-occurrence count or the color with respect to the plurality of training objects in the plurality of training images;
obtain, based on the co-occurrence count or the color, the training scores of the color combinations between the colors included in the plurality of training objects in the plurality of training images, and
obtain, based on the training scores of the color combinations, scores of color combinations of the plurality of objects in the spatial image.

6. The electronic device of claim 5, wherein
the first artificial intelligence model is trained to estimate, based on the training scores of the color combinations, a first color scheme score of a color combination between a color included in at least an object from the plurality of objects and the arbitrary color.

7. The electronic device of claim 6, wherein,
based on a determination the first object includes a plurality of faces including a first face and a second face, the first artificial intelligence model is trained to estimate a second color scheme score of a color combination between a color included in the first face and the arbitrary color, based on the training scores of the color combinations, and
the processor is further configured to execute the one or more instructions stored in the memory to provide color recommendation information with respect to the second face selected by the user, based on the second color scheme score.

8. The electronic device of claim 6, further comprising: a communication interface,
wherein the processor is further configured to execute the one or more instructions stored in the memory to, based on a determination the first object is an external device including a display, transmit the color recommendation information to the first object through the communication interface so that a color based on the color recommendation information with respect to the first object is displayed on the display of the first object.

9. The electronic device of claim 8, wherein
the processor is further configured to execute the one or more instructions stored in the memory to:
based on a determination the display includes a first panel and a second panel, obtain first color recommendation information with respect to the first panel and second color recommendation information with respect to the second panel, based on the first color scheme score of the color combination, and
transmit the first color recommendation information with respect to the first panel and the second color recommendation information with respect to the second panel to the first object through the communication interface so that a first color based on the first color recommendation information is displayed on the first panel, and a second color based on the second color recommendation information is displayed on the second panel.

10. The electronic device of claim 9, wherein
the processor is further configured to execute the one or more instructions stored in the memory to:
based on a determination the second panel is a part of the first panel, provide the first color recommendation information with respect to the first panel, based on the first color scheme score, and
provide the second color recommendation information with respect to the second panel, based on the first color scheme score and the second color scheme score.

11. The electronic device of claim 9, wherein, based on a determination the first object is a refrigerator, the second panel corresponds to a position of a food ingredient of which a storage period exceeds a threshold period.

12. The electronic device of claim 8, wherein
the processor is further configured to execute the one or more instructions stored in the memory to:
select an item corresponding to schedule information of the user, and
transmit information about the item and color recommendation information with respect to the first object to the first object through the communication interface so that the item is displayed on the display in a color based on the color recommendation information with respect to the first object.

13. A method, performed by an electronic device, of recommending a color of an object, the method comprising:
obtaining a spatial image comprising a plurality of pixels corresponding to a plurality of objects;
performing a pixel analysis on the plurality of pixels to extract one or more colors from the spatial image;
obtaining, based on the extracted one or more colors, color characteristic information about colors included in the plurality of objects in the spatial image and relation characteristic information defining relations between the plurality of objects in the spatial image;
obtaining, by applying the color characteristic information and the relation characteristic information to a first artificial intelligence model, a first color scheme score of a color combination, wherein the first artificial intelligence model is trained to estimate the first color scheme score of a color combination between a color included in at least an object from the plurality of objects in the spatial image and an arbitrary color, wherein the first artificial intelligence model is trained using (i) a co-occurrence count of color with respect to a plurality of training objects in a plurality of training images and (ii) training scores of combinations between colors included in the plurality of training objects in the plurality of training images, and
providing color recommendation information with respect to a first object selected by a user from the plurality of objects, based on the first color scheme score of the color combination.

14. The method of claim 13, wherein the relation characteristic information includes at least one of (i) information about position adjacency between at least two objects from the plurality of objects, or (ii) information about category relevance between the two objects.

15. The method of claim 13, further comprising:
obtaining information about a first interior style corresponding to the spatial image from a plurality of interior styles; and
selecting the first artificial intelligence model corresponding to the first interior style from a plurality of artificial intelligence models.

16. The method of claim 13, wherein
the first artificial intelligence model is configured to:
obtain the plurality of training images,
obtain, based on the plurality of training images, the co-occurrence count or the color with respect to the plurality of training objects in the plurality of training images,
obtain, based on the co-occurrence count or the color, the color, the training scores of the color combinations between the colors included in the plurality of training objects in the plurality of training images, and
obtain, based on the training scores of the color combinations, scores of color combinations of the plurality of objects in the spatial image.

17. The method of claim 16, wherein
the first artificial intelligence model is trained to estimate, based on the training scores of the color combinations, a first color scheme score of a color combination between a color included in at least a first object from the plurality of objects and the arbitrary color.

18. The method of claim 17, wherein,
based on a determination the first object includes a plurality of faces including a first face and a second face, the first artificial intelligence model is trained to estimate a second color scheme score of a color combination between a color included in the first face and the arbitrary color, based on the training scores of the color combinations, and color recommendation information with respect to the second face selected by the user is provided based on the second color scheme score.

19. The method of claim 17, further comprising: based on a determination the first object is an external device including a display, transmitting the color recommendation information to the first object through the communication interface so that a color based on the color recommendation information with respect to the first object is displayed on the display of the first object.

20. A non-transitory computer readable medium, having instructions stored therein, which when executed by a processor in an electronic device cause the processor to execute a method comprising:

obtaining a spatial image comprising a plurality of pixels corresponding to a plurality of objects;

performing a pixel analysis on the plurality of pixels to extract one or more colors from the spatial image, obtaining, based on the extracted one or more colors, color characteristic information about colors included in the plurality of objects in the spatial image and relation characteristic information defining relations between the plurality of objects in the spatial image;

obtaining, by applying the color characteristic information and the relation characteristic information to a first artificial intelligence model, a first color scheme score of a color combination; wherein the first artificial intelligence model is trained to estimate the first color scheme score of a color combination between a color included in at least an object from the plurality of objects in the spatial image and an arbitrary color, wherein the first artificial intelligence model is trained using (i) a co-occurrence count of color with respect to a plurality of training objects in a plurality of training images and (ii) training scores of color combinations between colors included in the plurality of training objects in the plurality of training images, and providing color recommendation information with respect to a first object selected by a user from the plurality of object, based on the score of the color combination.

* * * * *